(12) United States Patent
Chandramouli et al.

(10) Patent No.: US 8,873,580 B2
(45) Date of Patent: Oct. 28, 2014

(54) METHOD AND APPARATUS FOR DYNAMIC SPECTRUM ACCESS

(75) Inventors: Rajarathnam Chandramouli, Homdel, NJ (US); Shamik Sengupta, Jersey City, NJ (US); Kai Hong, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 1012 days.

(21) Appl. No.: 12/882,831

(22) Filed: Sep. 15, 2010

(65) Prior Publication Data

US 2011/0090853 A1   Apr. 21, 2011

Related U.S. Application Data

(63) Continuation-in-part of application No. 12/576,849, filed on Oct. 9, 2009.

(60) Provisional application No. 61/104,361, filed on Oct. 10, 2008, provisional application No. 61/250,294, filed on Oct. 9, 2009, provisional application No. 60/242,582, filed on Sep. 15, 2009.

(51) Int. Cl.
*H04J 3/24* (2006.01)
*H04W 28/10* (2009.01)
*H04W 28/18* (2009.01)
*H04W 16/22* (2009.01)
*H04W 28/22* (2009.01)
*H04W 84/18* (2009.01)
*H04W 24/10* (2009.01)

(52) U.S. Cl.
CPC .............. *H04W 28/10* (2013.01); *H04W 28/18* (2013.01); *H04W 16/22* (2013.01); *H04W 28/22* (2013.01); *H04W 84/18* (2013.01); *H04W 24/10* (2013.01)
USPC .......................................... 370/466; 370/469

(58) Field of Classification Search
USPC .......................................... 370/465, 466, 469
See application file for complete search history.

(56) References Cited

U.S. PATENT DOCUMENTS 6,614,768 B1   9/2003   Mahany et al.
6,993,026 B1 *  1/2006   Baum et al. ................... 370/469
(Continued)

FOREIGN PATENT DOCUMENTS

EP   0835009 A2   8/1998
EP   1944924 A1   7/2008

OTHER PUBLICATIONS

Written Opinion of International Searching Authority, mailed Jan. 11, 2011; issued in related International Patent Application No. PCT/US2010/048958.

(Continued)

*Primary Examiner* — Jeffrey M Rutkowski
(74) *Attorney, Agent, or Firm* — Greenberg Traurig, LLP

(57) ABSTRACT

Apparatus and methods are disclosed for improving wireless and other network communications, e.g., through improving resource utilization, which may comprise the steps of accumulating channel modeling information relating to channel performance; calculating a channel parameter threshold based on the accumulated channel modeling information, whereby the channel parameter, as measured, being above the threshold indicates the channel is a good channel; adjusting traffic over a selected good channel to improve performance of the network or a network resource. The network resource may comprises battery life for devices operating on the network, data rate for devices operating on the network, constituting or reconstituting ad hoc networks comprising nodes separated by multiple hops, continuity of connectivity within a single communication link over the network, etc. The apparatus and method of operating the apparatus may also comprise dynamically performing the adjusting step resulting from repeating the calculating step over time.

3 Claims, 27 Drawing Sheets

(56) References Cited

U.S. PATENT DOCUMENTS

| | | | |
|---|---|---|---|
| 7,224,697 B2 | 5/2007 | Banerjea et al. | |
| 7,558,229 B2 | 7/2009 | Bachl et al. | |
| 7,643,427 B2* | 1/2010 | Kokku et al. | 370/238 |
| 7,710,919 B2 | 5/2010 | Woo et al. | |
| 7,787,393 B2 | 8/2010 | Fallon et al. | |
| 7,839,788 B2* | 11/2010 | Qi | 370/235 |
| 7,912,002 B2 | 3/2011 | Gaur | |
| 8,391,135 B1 | 3/2013 | Kuhn | |
| 8,503,383 B2 | 8/2013 | Hu et al. | |
| 8,509,159 B2 | 8/2013 | Shao et al. | |
| 8,516,096 B2* | 8/2013 | LeBlanc et al. | 709/223 |
| 2002/0024964 A1* | 2/2002 | Baum et al. | 370/419 |
| 2002/0059451 A1* | 5/2002 | Haviv | 709/238 |
| 2003/0108034 A1* | 6/2003 | Yu | 370/469 |
| 2004/0152429 A1 | 8/2004 | Haub et al. | |
| 2004/0203820 A1 | 10/2004 | Billhartz | |
| 2004/0236547 A1 | 11/2004 | Rappaport et al. | |
| 2007/0101133 A1 | 5/2007 | Liu et al. | |
| 2007/0268862 A1 | 11/2007 | Singh et al. | |
| 2008/0107124 A1* | 5/2008 | Ros-Giralt | 370/401 |
| 2008/0151893 A1* | 6/2008 | Nordmark et al. | 370/392 |
| 2008/0192686 A1 | 8/2008 | Cho et al. | |
| 2009/0252095 A1 | 10/2009 | Lu et al. | |
| 2009/0296737 A1* | 12/2009 | Arye | 370/465 |
| 2010/0008291 A1* | 1/2010 | LeBlanc et al. | 370/328 |
| 2010/0135226 A1 | 6/2010 | Chandramouli et al. | |
| 2010/0232380 A1 | 9/2010 | Choi et al. | |
| 2010/0238868 A1 | 9/2010 | Melpignano et al. | |
| 2011/0032892 A1 | 2/2011 | Bahl et al. | |
| 2011/0164518 A1* | 7/2011 | Daraiseh et al. | 370/252 |
| 2011/0185053 A1* | 7/2011 | Larson et al. | 709/223 |
| 2013/0239171 A1* | 9/2013 | Ramesh et al. | 726/1 |

OTHER PUBLICATIONS

International Search Report of International Searching Authority, mailed Jan. 11, 2011, issued in related International Patent Application No. PCT/US2010/048958.

Buddhikot, M. et at, "DIMSUMnet: New Directions in Wireless Networking Using Coordinated Dynamic Spectrum Access", IEEE International Symposium on a World of Wireless, Mobile and Multimedia Networks, 2005, pp. 78-85.

Choi, N. et al., "A Full Duplex Multi-Channel MAC Protocol for Multi-hop Cognitive Radio Networks", 1st International Conference on Cognitive Radio Oriented Wireless Networks and Communications, Jun. 8-10, 2006, pp. 1-5.

Cordeiro, C. et al,, "C-MAC: A Cognitive MAC Protocol for Multi-Channel Wireless Networks", 2nd IEEE International Symposium on New Frontiers in Dynamic Spectrum Access Networks (DySPAN), Apr. 17-20, 2007, pp. 147-157.

Harada, H. et al., "Software Defined Cognitive Radio Prototype toward IMT-Advanced Wireless Communication Systems". IEEE 18th International Symposium on Personal, Indoor and Mobile Radio Communications (PIMRC), Sep. 3-7, 2007, pp. 7-10.

Lee, B. et al., "Adaptive MAC Protocol for Throughput Enhancement in Cognitive Radio Networks", International Conference on Information Networking (ICOIN), Jan. 23-25, 2008, pp. 1-5.

Ma, L. et al., "Dynamic Open Spectrum Sharing MAC Protocol for Wireless Ad Hoc Networks", in IEEE DySPAN, Nov. 2005, pp. 203-213.

Kim, H. et al., "An Experimental Approach to Spectrum Sensing in Cognitive Radio Networks with Off-the-Shelf IEEE 802.11 Devices", 4th IEEE Consumer Communications and Networking Conference (CCNC), Jan. 11-13, 2007, pp. 1154-1158.

Su, H. et al., "Cross-Layer Based Opportunistic MAC Protocols for QoS Provisionings Over Cognitive Radio Wireless Networks", IEEE Journal on Selected Areas in Communications, vol. 26, Issue 1, Jan. 2008, pp. 118-129.

Yuan Y. et al., "KNOWS. Cognitive Radio Networks Over White Spaces", 2nd IEEE International Symposium on New Frontiers in Dynamic Spectrum Access Networks (DySPAN), Apr. 17-20, 2007, pp. 416-427.

Zhao, Q. et al., "Decentralized Cognitive MAC for Dynamic Spectrum Access", in IEEE DySPAN, Nov. 2005.

Federal Communications Commission (FCC), "Notice of Proposed Rule Making", May 2004.

McHenry M. et al., "New York City Spectrum Occupancy Measurements Sep. 2004", Shared Spectrum Company, Dec. 15, 2004, pp. 1-95.

A Combined Search and Examination Report issued on Feb. 24, 2014 in connection with Applicants' U.K. Patent Application No. GB1402562.1.

An Examination Report issued on Feb. 12, 2014 in connection with Applicants' related U.K. Patent Application No. GB1206502.5.

An Examination Report issued Dec. 24, 2012 in connection with UK Patent Application No. GB1206502.5.

A First Action Interview Pilot Program Pre-Interview Communication issued Jun. 6, 2013 for U.S. Appl. No. 12/576,849.

Examination Report issued by the UK Intellectual Property Office on May 29, 2014 in connection with GB Application No. 15402562.1.

* cited by examiner

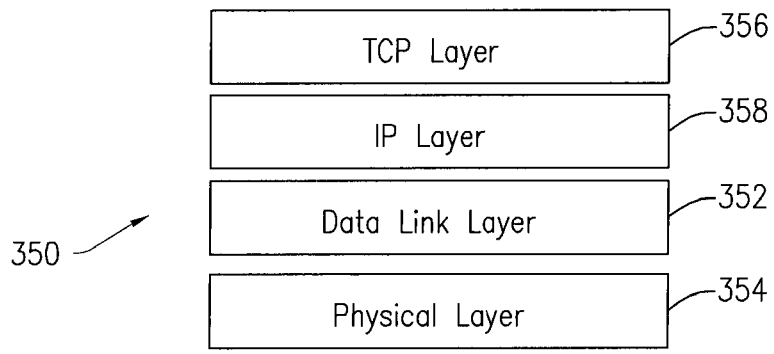
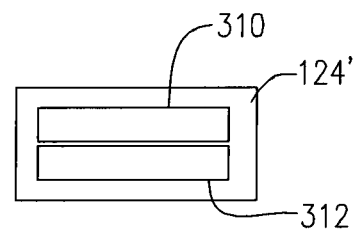
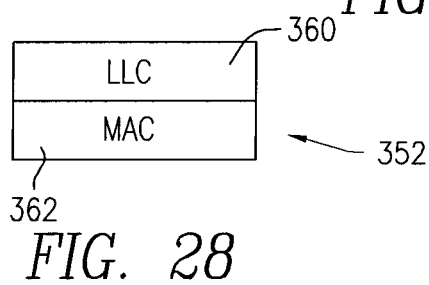
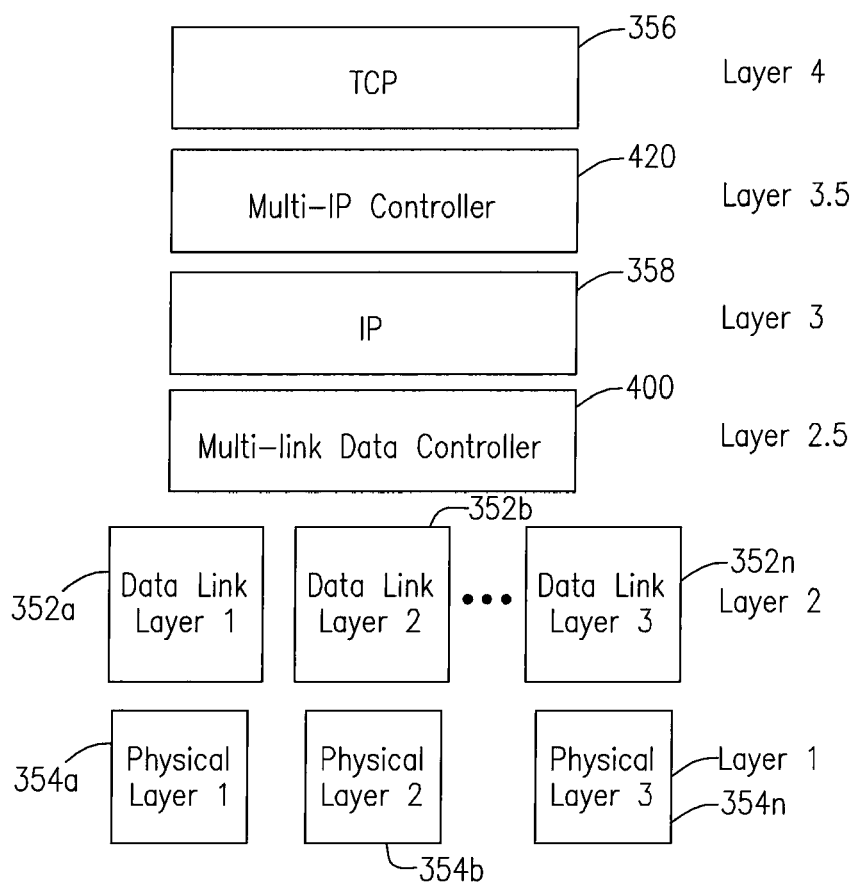

METHOD AND APPARATUS FOR DYNAMIC SPECTRUM ACCESS

CROSS-REFERENCE TO RELATED APPLICATIONS

The present application is a continuation-in-part of U.S. Non-Provisional patent application Ser. No. 12/576,849, filed on Oct. 9, 2009, entitled METHOD AND APPARATUS FOR DYNAMIC SPECTRUM ACCESS, which claims the benefit of priority to U.S. Provisional Patent Application Ser. No. 61/104,361, filed on Oct. 10, 2008. This application also claims priority to U.S. Provisional Application Ser. Nos. 61/250,294, filed on Oct. 9, 2009, entitled METHOD AND APPARATUS FOR DYNAMIC SPECTRUM ACCESS, and 61/242,582, filed on Sep. 15, 2009, entitled MAC AND ROUTING LAYER METHODS FOR CREATING VIRTUAL LINKS AND CROSS LAYER OPTIMIZATION. The disclosures of each of the foregoing related applications are herein incorporated by reference in their entirety for all purposes.

STATEMENT REGARDING FEDERALLY SPONSORED RESEARCH

Some of the research performed in the development of the disclosed subject matter was supported by U.S. Grant No. 2007-IJ-CX-K020 from the National Institute of Justice. The U.S. government may have certain rights with respect to this application.

FIELD OF THE INVENTION

The disclosed subject matter relates to a device and method for optimizing wireless networks, and, more particularly, to a device and method for gathering data for dynamic spectrum access, and using the data to optimize device and network resources and parameters, such as battery utilization or network operational activities, and also to wireless ad-hoc or mesh networks, and more particularly to routing in such networks. In addition, the subject matter relates to utilizing a plurality of different physical devices to complete a plurality of links between two communication devices and to communicate over those links.

BACKGROUND OF THE INVENTION

With recent proliferation in wireless services and amplification in the number of end-users, the wireless industry is fast moving toward a new wireless networking model where wireless service providers are finding it difficult to satisfy users and increase revenue with just the spectrum statically allocated. Spectrum usage being both space and time dependent, a static allocation often leads to low spectrum utilization and "artificial scarcity" of spectrum resulting in a significant amount of "white space" (unused band) available in several spectral bands that could be exploited by both licensed and unlicensed services. In order to break away from the inflexibility and inefficiencies of static spectrum allocation, the new concept of dynamic spectrum access ("DSA") is being investigated by network and radio engineers, policy makers, and economists.

In DSA, spectrum can be opportunistically accessed dynamically by end-users in a time and space variant manner. Emerging wireless technologies such as cognitive radios, which sense the operating environment and adapt themselves to maximize performance, is anticipated to make DSA a reality.

The FCC has defined provisions that allow unlicensed devices (secondary users) to operate in the licensed bands (primary bands) opportunistically so long as the unlicensed devices avoid licensed services (primary incumbents) who are the primary owners of these bands. Thus for unlicensed devices to gain access to this opportunistic spectrum access, the FCC requires that the unlicensed devices operating on a primary band, upon arrival of a primary user(s) on this particular primary band, stop secondary communication within a certain time threshold T (the value of T may vary depending on the nature of licensed services), and switch to a new unused band.

A cognitive radio ("CR") must periodically perform spectrum sensing and operate at any unused frequency in the licensed or unlicensed band, regardless of whether the frequency is assigned to licensed services or not. But the most important regulatory aspect is that cognitive radios must not interfere with the operation in some licensed band and must identify and avoid such bands in a timely manner. Cognitive radio enabled secondary devices operating on some primary band(s) upon detecting primary incumbents in that band(s) to automatically switch to another channel or mode within a certain time threshold. Thus accurate sensing/detection of the arrival of primary incumbents and hence the switching (moving) to some other channel are two of the most important challenging tasks in a cognitive radio network.

Cognitive radios can be viewed as electromagnetic spectrum detectors, which can find an unoccupied band and adapt the carrier to that band. The layer functionalities of cognitive radios can be separated into the physical (PHY) layer and the medium access control (MAC) layer. The physical layer includes sensing (scanning the frequency spectrum and process wideband signal), cognition (detecting the signal through energy detector), and adaptation (optimizing the frequency spectrum usage such as power, band and modulation). The medium access layer cooperates with the sensing measurement and coordinates in accessing spectrum. The requirement is that whenever cognitive radio detects primary incumbents in the currently operating channel, it must switch to some other channel within a certain time T.

Applicants propose improvements to wireless communication utilizing the information gathered and processed by the respective communication devices for spectrum selection and switching.

A wireless mesh network (WMN) is a communications network made up of radio nodes organized in a mesh topology. Wireless mesh networks often consist of mesh clients, mesh routers and gateways. The mesh clients are often laptops, cell phones and other wireless devices while the mesh routers forward traffic to and from the gateways which may, but need not, connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technologies including 802.11, 802.16, cellular technologies or combinations of more than one type.

A wireless mesh network can be seen as a special type of wireless ad-hoc network. It is often assumed that all nodes in a wireless mesh network are immobile but this need not be so.

The mesh routers may be highly mobile. Often the mesh routers are not limited in terms of resources compared to other nodes in the network and thus can be exploited to perform more resource intensive functions. In this way, the wireless mesh network differs from an ad-hoc network since all of these nodes are often constrained by resources.

On wireless computer networks, an ad-hoc mode can be a method for wireless devices to directly communicate with each other. Operating in an ad-hoc mode allows all wireless devices within range of each other to discover and communicate in peer-to-peer fashion without involving central access points (including, e.g., those built in to broadband wireless routers). To set up an ad-hoc wireless network, each wireless adapter must be configured for ad-hoc mode versus the alternative infrastructure mode. In addition, all wireless adapters on the ad-hoc network must use the same service set identifier ("SSID") and the same channel number.

An ad-hoc network tends to feature a small group of devices all in very close proximity to each other. Performance suffers as the number of devices grows, and a large ad-hoc network quickly becomes difficult to manage. Ad hoc networks make sense when there is a need to build a small, all-wireless LAN quickly and spend the minimum amount of money on equipment. Ad hoc networks also work well as a temporary fallback mechanism if normally-available infrastructure mode gear (access points or routers) stop functioning, or in, e.g., addressing emergency contingencies.

Key network data linking and routing tasks are performed in a data link layer ("DLL"), such as logical link control ("LLC"), which refers to the functions required for the establishment and control of logical links between local devices on a network. This is usually considered a DLL sub-layer and provides services to a network layer above the data link layer. The data link layer LLC hides the rest of the details of the data link layer to allow different technologies to work seamlessly with the higher layers. Most local area networking technologies use the IEEE 802.2 LLC protocol. Another task is referred to as Media Access Control ("MAC"), which refers to the procedures used by devices to control access to the network medium, e.g., through a physical layer.

Since many networks use a shared medium (such as a single network cable, or a series of cables that are electrically connected into a single virtual medium, or a single wireless communications channel) it is necessary to have rules for managing the medium to avoid conflicts. For example, Ethernet uses the carrier sense multiple access with collision detection ("CSMA/CD") method of media access control, while Token Ring uses token passing. Still another task is Data Framing, which relates to the data link layer being responsible for the final encapsulation of higher-level messages into frames that are sent over the network at the physical layer. Also accounted for is the task of addressing, wherein the data link layer is the lowest layer in the Open System Interconnection ("OSI") model that is concerned with addressing, i.e., labeling information with a particular destination location.

Each device on a network has a unique number, usually called a hardware address or MAC address, that is used by the data link layer protocol to ensure that data intended for a specific machine gets to it properly. Finally there is the task of Error Detection and Handling, by which, the data link layer handles errors that occur at the lower levels of the network stack. For example, a cyclic redundancy check (CRC) field can be employed to allow a station receiving data to detect if the data was received correctly.

Applicants propose routing changes to the current routing technology in such networks in order to improve network performance, such as throughput.

The physical layer and data link layer are very closely related. The requirements for the physical layer of a network are often part of the data link layer definition of a particular technology. Certain physical layer hardware and encoding aspects are specified by the DLL technology being used. The best example of this is the Ethernet standard, IEEE 802.3, which specifies not just how Ethernet works at the data link layer, but also its various physical layers.

Since the data link layer and physical layer are so closely related, many types of hardware are associated with the data link layer. Network interface cards ("NICs") typically implement a specific data link layer technology, so they are often called "Ethernet cards", "Token Ring cards", and so on. There are also a number of network interconnection devices that are said to "operate at layer 2", in whole or in part, because they make decisions about what to do with data they receive by looking at data link layer frames. These devices include most bridges, switches and barters, though the latter two also encompass functions performed by layer three.

Some of the most popular technologies and protocols generally associated with layer 2 are Ethernet, Token Ring, fiber distributed data interface ("FDDI") (plus copper distributed data interface ("CDDI")), home phone line networking alliance ("HomePNA"), IEEE 802.11 ("wireless local area network" ("LAN"), "wireless Ethernet" or "wi-fi"), asynchronous transfer mode ("ATM"), and transmission control protocol/internet protocol ("TCP/IP's") Serial Link Interface. The data link layer, therefore, is the place where most LAN and wireless LAN technologies are defined. Layer two is responsible for logical link control, media access control, hardware addressing, error detection and handling, and defining physical layer standards. It is often divided into the logical link control (LLC) and media access control (MAC) sub-layers, based on the IEEE 802 Project that uses that architecture.

Wireless ad-hoc and mesh networks (for example, based on IEEE 802.11 standards) are gaining prominence and play a major role in many applications. For example, during a natural disaster, a wireless mesh network for first responder communications could be established quickly. Some device constraints in a mesh network may include limited battery power and computational capabilities. In a traditional network protocol stack a data packet that is to be routed through the network experiences processing delays at every intermediate routing node. This processing delay includes computing the next best hop for the packet, re-encapsulating the packet depending on the address of the next hop, etc. Applicants have determined experimentally that, for a two hop wireless ad-hoc setup, one observes that 20% of the Round Trip Time ("RTT") is due to these processing delays; for a three hop ad-hoc network, this is around 26% of the total RTT. At a routing node, on an average, 40% of the processing time is used to compute the next hop. Clearly, these delays result in battery power waste, data rate reductions, etc.

FIG. 19 shows a typical processing path and the system structure 100 for wired networks like the Ethernet. Here the physical layer 122 and most of the MAC layer 124 functionalities are implemented in a network interface card 120. This hardware implementation minimizes the impact due to computation induced delay and power consumption. However, this situation is different in a wireless network. FIG. 20 shows the same typical process 100' for a wireless network protocol stack. The MAC layer 124' in this protocol stack is very complex, prohibiting implementation in the wireless network interface card, such as 120 in FIG. 19. As a result, the wireless network interface card usually only implements the physical layer 122' features. Most of the MAC layer 124' features are implemented as part of a module 140 (e.g., in most cases it will be the device driver) in the operating system.

Typically, the routing layer 132 is implemented in the network layer 130. Under this structure, the routing layer 132 has three major functions. First, it maintains the routing table, including route discovery, creating a corresponding routing entry in the routing table and modifying or deleting routing entries when a route is moved, etc. Second, this layer 132 is responsible for computing the best next suitable hop for the data packet. Third, the layer 132 is responsible for re-encapsulating the data packet according to the corresponding route entry.

Applicants propose ways to address the shortcomings noted above in wireless mesh networks.

Communication devices with multiple wireless physical layer (PHY) interfaces are becoming common place. For example, smart phones can connect to a cellular network or a WiFi network using the two corresponding built-in radio interfaces. However, with current technologies a communication device equipped with multiple PHY interfaces can use only one interface to connect to one wireless network at a time. This leads to an under-utilization of radio resources such as the available spectrum from multiple networks that a device can access using its multiple PHY interfaces.

For instance, in the traditional TCP/IP protocol stack 350 as illustrated in FIG. 27, having a TCP layer 356 and an IP layer 358, a data link layer 352 may control a physical layer 354 of the device. The data link layer 352 may be divided into sub-layers: (a) a Logic Link Control sub-layer 360 and (b) a Media Access Control (MAC) sub-layer 362, as illustrated schematically and in block diagram form in FIG. 28. The MAC layer 362 may be designed so that it can control multiple physical devices. However, in a majority of the communication devices, part of the MAC layer 362 may be integrated into the hardware of the PHY layer 354. Therefore, modifying the MAC layer 362 to control multiple physical devices may require that the PHY layer 354 hardware also be modified. This may be impossible or cost prohibitive given that millions of PHY layer 354 hardware devices are manufactured and integrated into consumer communication devices.

Applicants propose improvements to the communication network to address these shortcomings.

SUMMARY OF THE INVENTION

Apparatus and methods are disclosed for improving wireless and other network communications, e.g., through improving resource utilization, which may comprise the steps of accumulating channel modeling information relating to channel performance; calculating a channel parameter threshold based on the accumulated channel modeling information, whereby the channel parameter, as measured, being above the threshold indicates the channel is a good channel; adjusting traffic over a selected good channel to improve performance of the network or a network resource. The network resource may comprises battery life for devices operating on the network, data rate for devices operating on the network, constituting or reconstituting ad hoc networks comprising nodes separated by multiple hops, continuity of connectivity within a single communication link over the network, etc. The apparatus and method of operating the apparatus may also comprise dynamically performing the adjusting step resulting from repeating the calculating step over time.

The method and apparatus for improving communications over a network may comprise facilitating wireless network communication between first and second network communication devices, which may comprise the steps of establishing a first communication link between a first communication device and a second communication device through a first physical link data channel for transmitting a packet; determining at the second communication device, as to a received packet, whether a destination communication device indicated by the packet is connected to the second communication device through a second physical link; and creating a virtual link between the first communication device and the destination communication device through the pair of first and second physical links. The wireless network may be an ad hoc wireless network.

The second communication device may be selected by the first communication device to receive a packet based upon the existence of the first physical link, whereby the first communication device and second communication device are within communication range of each other. The second communication device may designate the destination communication device for the packet based upon the existence of the second physical link, whereby the second communication device and the destination communication device are within communication range of each other.

The second communication device may have no physical link to the destination device, wherein the method and apparatus may further comprise the step of the second communication device designating a third communication device intermediate the second communication device and the destination communication device based on there being a virtual link between the second communication device and the destination communication device through the third communication device. The second communication device may select the third communication device from a learned table of virtual links wherein the destination communication device is indicated to be connected to the second communication device by a virtual link through the third communication device.

The apparatus and the method for utilizing the apparatus may comprise a method of communicating from a first communication device to a second communication device, which may comprise operating a first communication device having a plurality of physical layer interfaces, each adapted for connection to a respective one of a plurality of communication networks; communicating with a second communication device connected to at least two of the plurality of communication networks simultaneously over the respective ones of the plurality of networks to which each of the first and second communication devices are each connected.

The step of communicating may further comprise the first communication device sending the same communication to the second communication device over each network to which the first and second communication devices are connected and through which the first and second communication devices are communicating, to thereby decrease the probability of the communication interrupting before completed.

The step of communicating may further comprise the first communication device sending different communications to the second communications device over each network to which the first and second communication devices are connected and through which the first and second communication devices are communicating, to thereby increase the bandwidth available for communication between the first and second communication devices.

BRIEF DESCRIPTION OF THE DRAWINGS

For a more complete understanding of the disclosed subject matter, reference is made to the following detailed description of exemplary embodiments considered in conjunction with the accompanying drawings, in which:

FIG. 26 illustrates schematically and in block diagram form, by way of an example, extra modules proposed to be created in the wireless MAC Layer according to aspects of an embodiment of the disclosed subject matter;

FIG. 27 illustrates schematically and in block diagram form, by way of an example, a traditional protocol stack, such as the TCP layer stack;

FIG. 28 illustrates schematically and in block diagram form a data link layer divided into sub-layers according to aspects of an embodiment of the disclosed subject matter;

FIG. 29 illustrates schematically and in block diagram form a multi-data link control layer according to aspects of an embodiment of the disclosed subject matter;

DETAILED DESCRIPTION OF THE INVENTION

Figure 1:
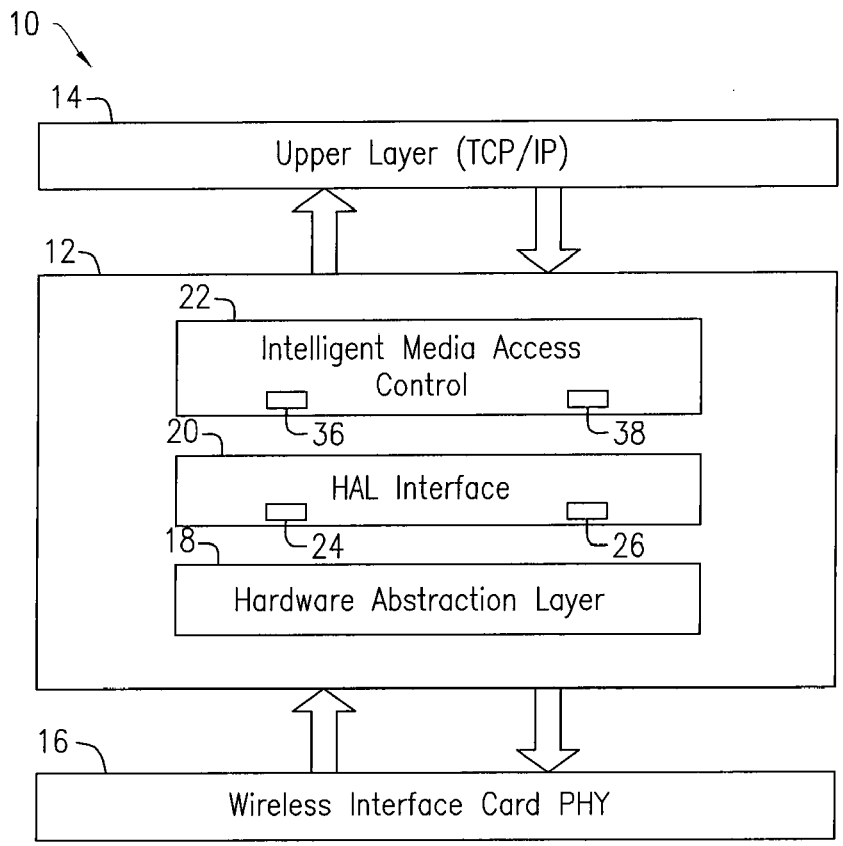
FIG. 1 is a block diagram of the network protocol stack for one embodiment of the disclosed subject matter.

FIG. 1 illustrates a network protocol stack 10 constructed in accordance with aspects of an embodiment of the disclosed subject matter. The protocol stack 10 includes a MAC layer 12 which is modified from a current typical MAC layer protocol, and upper and physical layers 14, 16 which are not modified from current typical upper and physical layer protocols. The MAC layer 12 includes modules, processes, and features that optimize operating efficiencies for cognitive radios. Cognitive radios ("CRs") are guided by the MAC layer 12 protocol in efficiently performing spectrum sensing when operating in any unused frequency in a licensed or unlicensed band, and efficiently switching so as not to interfere with and thus enable co-existence with any incumbent operation in the licensed band.

Dynamic spectrum access (i.e., opportunistically accessing the spectrum dynamically) functions performed by cognitive radios are therefore guided by the MAC layer 12. The MAC layer 12 may be deployed in firmware on a wireless access card. More particularly, the MAC layer 12 includes three sub-layers: a hardware abstraction (HAL) layer 18, a programmable interface to the hardware abstraction layer or HAL interface layer 20, and an intelligent media access control (IMAC) layer 22. The MAC layer 12 sub-layers 18, 20, 22, are discussed below.

Hardware Abstraction Layer

The HAL layer 18 is implemented between the physical hardware of the cognitive radio ("CR"), through the PHY layer 16, and the controlling software (e.g., protocol) that runs on the CR node processor. Its function is to hide differences in hardware at the lower layer 16 from the controlling software that runs on the CR node processor.

Hardware Abstraction Layer Interface

Special purpose hardware queues such as a synchronization queue (synch queue) 24 and a data buffer queue 26 are implemented in the HAL interface layer 20. These software-only queues create a virtual hardware buffer that helps upper layers 14 buffer the data during channel switching. These queues 24, 26 help in synchronization during channel switching as well as buffering the upper layer 14 data to prevent loss during switching. The synchronization and data buffer queues 24, 26 are discussed in greater detail below. The HAL interface layer 20 is modified to facilitate user access to a modified function described below. The HAL interface layer 20 also facilitates cognitive radio software stack developer tests on channel switching, sensing and other protocols.

Intelligent Media Control Layer

Figure 2:
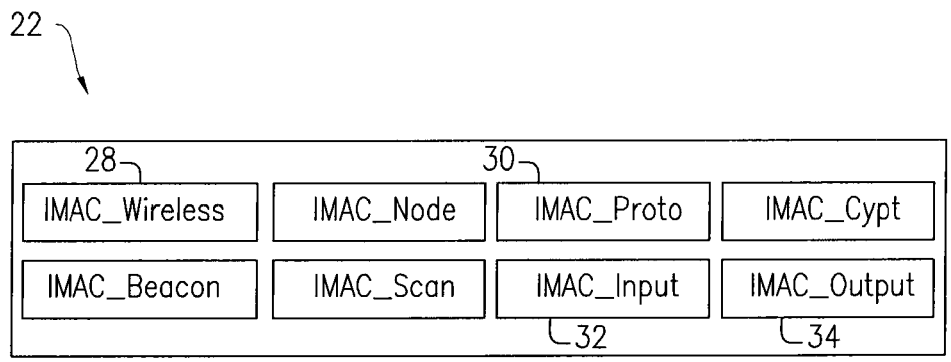
FIG. 2 is block diagram of the function modules of an Intelligent Media Access layer shown in FIG. 1.

Referring to FIG. 2, the IMAC layer 22 is divided into eight different sub-modules. Modifications to the IMAC layer 22 protocol (i.e., to support cognitive radios) are provided on four of these sub-modules. More particularly, a modified IMAC_Wireless module 28, a modified IMAC_Proto module 30, a modified IMAC_Input module 32, and a modified IMAC_Output module 34 are discussed below.

Modified IMAC_Wireless Module

The modified IMAC_Wireless module 28 is responsible for command executions from the user space. An extended user space command has been added to the modified IMAC_Wireless module 28. Users can send switching signals to the cognitive radio for triggering a switching scheme, via the HAL interface layer 20. This function is mainly used for testing purposes. With the support of this command, a cognitive radio software stack developer can test the channel switching, sensing and other protocols via the HAL interface layer 20.

Modified IMAC_Proto Module

The IMAC_Proto module 30 controls processes including timer functions for timeout events. In the existing radio protocol, whenever any reconfiguration on any node is done, the node restarts itself and goes into a scan mode, and the neighbor table will be rebuilt (i.e., the bootstrapping process). Under this condition, the process may need more than hundreds of milliseconds. However, in the cognitive radio, due to the automated channel switching function, the node has to reconfigure itself in a short time. In order to solve this issue and make this process as fast as possible, a modified function has been implemented in the IMAC_Proto module 30.

The modified function includes a dynamic optimized threshold sub-module 36 for efficiently triggering switching, and a destination channel bitmap vector sub-module 38 for efficiently re-synchronizing nodes. Under the IMAC_Proto module 30, bootstrapping may take no more than 1 millisecond.

Modified IMAC_Input Module

Figure 3:
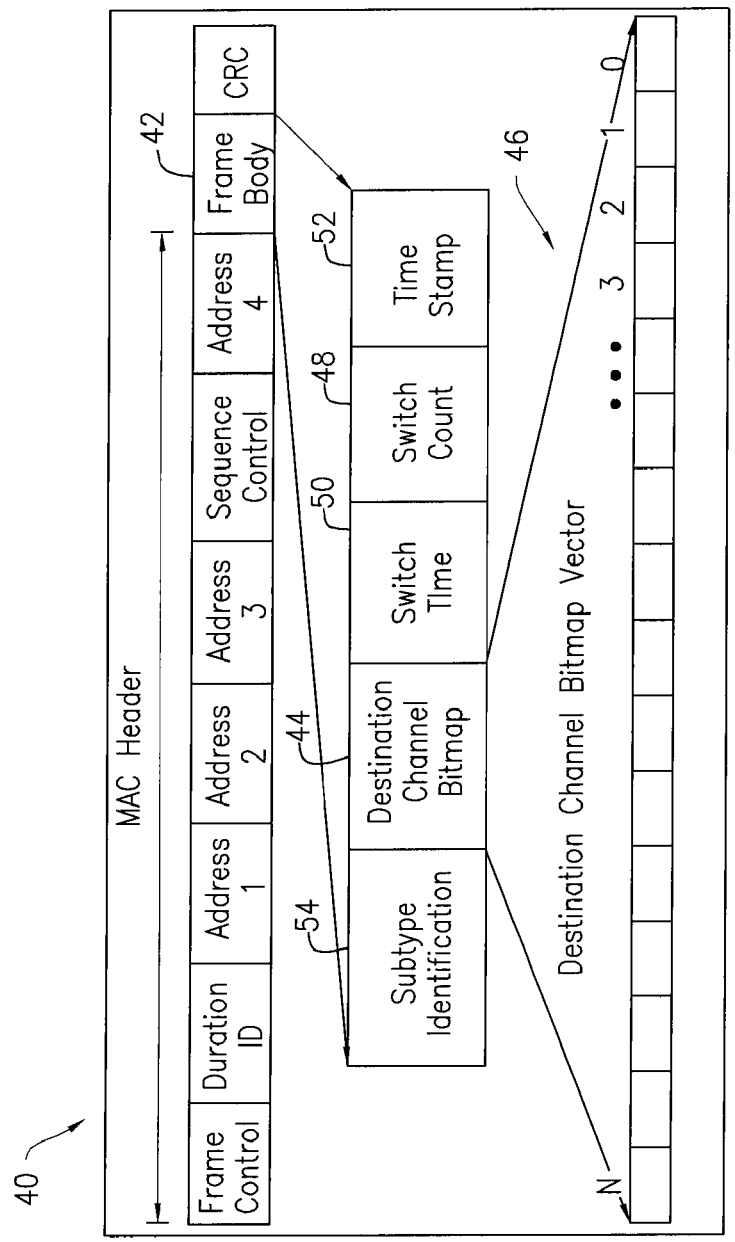
FIG. 3 is a schematic diagram showing the channel switching request MAC management frame structure.

The modified IMAC_Input module 32 processes all the raw data, which comes from the hardware, including a modified management frame 40 (see FIG. 3). An extended management frame process function involving the management frame 40 has been implemented in the modified IMAC_Input Module 32. The management frame 40 structure supports identifying vacant channels as well as re-synchronizing nodes quickly. A frame body 42 in the management frame 40 has been modified to include a destination channel bitmap 44 which is defined in terms of a destination bitmap vector 46. The frame body 42 also includes a switch count 48, a switch time 50, a time stamp 52, and a subtype identification 54 which all coordinate to support the functioning of the frame body 42. The management frame processes involving the frame body 42 of the management frame 40 are described below.

Modified IMAC_Output Module

The modified IMAC_Output module 34 takes care of the data frame, the management frame 40 and the control frame for output purposes. The modified IMAC_Output module 34 wraps the data from the upper layer 14 into the suitable format, and then sends it to the hardware. Incumbent sensing and detection is an important feature of the cognitive radio IMAC layer 22, and the entire secondary communication based on dynamic spectrum access is dependent on this as spectrum is shared with licensed devices. Cognitive radio functions involved with incumbent sensing/detecting are described below.

Methodology for Sensing/Detecting Primary Incumbents

At any point in time, primary incumbents may be operating in a region and channel that is the same as that of the cognitive radio node(s). To co-exist with the incumbents, it is mandatory that incumbent sensing is done efficiently by the cognitive radio nodes. However, as mere energy, noise and interference detection is not sufficient to distinguish a primary incumbent communication from other cognitive radio (secondary) communications, the IMAC layer 22 provides for accurate sensing/detection. The IMAC layer 22 provides processes for sensing/detection which is based on the preamble of the packets transmitted by primary incumbents which are always different than the preamble of the packets transmitted by cognitive radio nodes. Thus whenever the primary incumbents are present and transmitting (as well as unlicensed transmitting nodes), cognitive radios present in that channel will observe packets with different packet preamble or corrupted packet preamble (known as observed PHY errors) upon sensing of the channel. Thus observing PHY errors by cognitive radio nodes gives an indication of the presence of primary incumbents in a channel (as well as the presence of transmitting unlicensed nodes). Similarly, sensing/detection may be based on other parameters such as combination(s) of energy, PHY errors, cyclic redundancy checking (CRC), checksum errors, MAC address, and Internet protocol (IP) addresses.

The spectrum sensing process is divided into two processes, In-band Fast Sensing and Out-band Fine Sensing. In-Band Fast sensing is done fairly quickly over a sensing window of duration T1 and it is performed in-band simultaneously with data transmissions (i.e., the cognitive radio node is sensing the presence of an incumbent which will trigger a switch to a vacant candidate channel). The advantage of in-band fast sensing is that data transmission time is not wasted.

Out-band Fine Sensing on the other hand is mostly performed out-band for a sensing window of duration T2 (i.e., the CR node is sensing the presence of an incumbent in the candidate channel). Cognitive radio nodes become silent on the channel under consideration for sensing so that no network traffic is generated and incumbents are sensed. Data transmission time is wasted during out-band fine sensing and throughput of the network is compromised.

In another cognitive radio embodiment, the cognitive radio can have two internal radios. One radio can be used for in-band sensing while the other radio can perform out-band sensing simultaneously to determine vacant candidate channels. This would further contribute to the maintenance of throughput and the minimization of wasted channel capacity.

There are two major challenges in the above-mentioned sensing approach—PHY error false indications and suppression. PHY errors can be observed even in the absence of primary incumbents due to the unreliable nature of the wireless medium. In the In-band fast sensing, the cognitive radio nodes carry out communication at the time of sensing. Thus the actual number of observed PHY errors is less here as cognitive radio node communication suppresses many of the PHY errors.

Therefore, a simple static threshold of observed PHY error is not sufficient to sense/detect incumbents. If the threshold is set too low, the cognitive radio will incur a high number of false alarms (assuming the existence of a primary incumbent while the primary incumbent is actually not present). On the other hand, if the threshold is set too high, there will be a high probability of misdetection (concluding there is no primary incumbent while the primary incumbent is actually present).

The IMAC layer 22 includes a dynamic optimized threshold 36 (see FIG. 1) that solves this problem. To fully understand the factors that support the dynamic optimized threshold 36, and the processes involved with its use, its method of discovery and empirical derivation are described below.

Empirical Derivation of the Dynamic Optimized Threshold

To solve the sensing/detecting problem described above, a methodology was devised to understand the distribution of PHY errors, and a study was conducted to determine the dynamic optimized threshold necessary to sense/detect the primary incumbents. The dynamic optimized threshold 36 study was based on PHY error data which was modeled to optimize the primary incumbent detection threshold. The experiments and analysis are provided below, first for in-band sensing and then for out-band sensing.

Figure 4:
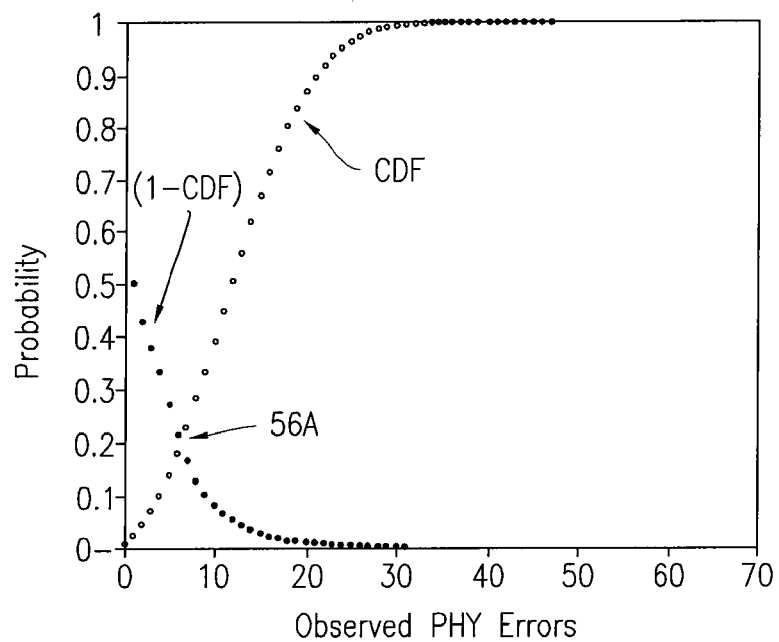
FIG. 4 is a graph showing the functional relationship of false alarm and misdetection probability vs. PHY errors threshold for a 1-window sensing strategy (in-band fast sensing)

In-Band Fast Sensing:

FIG. 4 depicts a cumulative distribution function (CDF) and complementary cumulative distribution function (1-CDF) of the observed PHY errors of case (i) when a primary incumbent is present and case (ii) when the primary incumbent is not present respectively based upon the experimentally observed data. The sensing window duration is assumed as 1, i.e., the experimentally observed data are calculated over the sensing duration T1. It can then be stated that the CDF of the case when a primary incumbent is present is actually a representation of the probability of misdetection given a certain PHY error threshold. Similarly, (1-CDF) of the case when primary incumbent is not present is actually a representation of the probability of false alarm given a certain PHY error threshold.

FIG. 4 shows that a low threshold will reduce the misdetection probability; however it will increase the false alarm probability. On the other hand, a high threshold will increase the misdetection probability while it will reduce the false alarm probability. Thus, in one proposition, if it is required to minimize both false alarm and misdetection probabilities simultaneously, the intersection 56A of the two curves gives us the optimized minimized probability and the corresponding x-axis value will be the dynamic optimized threshold. The other proposition can also be used, e.g., minimizing misdetection probability alone if misdetection incurs high regulation cost, or even weighting minimization of false alarm and misdetection probabilities where misdetection probability might incur higher cost than false alarms or vice-versa.

With one window sensing duration of In-band fast sensing, the simultaneous minimization of both the probabilities provides the optimized threshold. However, as FIG. 4 indicates, minimized error probability corresponding to the intersection 56A of the two curves CDF and (1-CDF) is around 0.15. This indicates that In-band fast sensing over a sensing duration of the window (T1), although fast and able to be performed preformed simultaneously with data transmission of the cognitive radio, is unreliable and thus needs to be modified. In one embodiment T1 equal to 20 milliseconds (ms) is utilized. Other embodiments can also be used (e.g., T1 equal to 30 ms, 50 ms, etc.)

Therefore, a new method of using a sliding or n-moving window In-band fast sensing is proposed (i.e., PHY errors are observed over n sensing window durations and moved continuously, overlapping in time—that is, two adjacent windows of measurement that overlap by n-samples). The number n can take any value of 2, 3, 4 . . . and so on.

Figure 5:
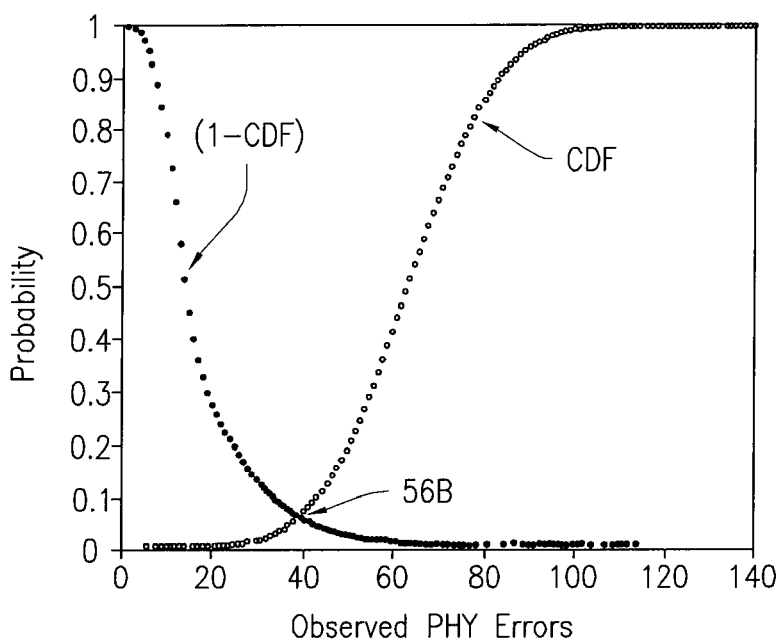
FIG. 5 is a graph showing the functional relationship of false alarm and misdetection probability vs. PHY errors threshold for a 5-window sensing strategy (in-band fast sensing)

FIG. 5 depicts the experimentally observed results over a span of 5 moving windows. With a 5-moving window sensing strategy of In-band fast sensing, the simultaneous minimization of both the probabilities gives us the optimized threshold and indicates the minimized error probability corresponding to the intersection 56B of the two curves CDF and (1-CDF) is now around 0.04. This indicates that 5-moving window In-band fast sensing provides better performance as opposed to a sensing duration of one window (T1). Moreover, as data transmission for cognitive radio nodes are carried out simultaneously, data throughput is also not degraded.

Given the experimentally observed results of misdetection and false alarm, the analytical model of misdetection and false alarm probability distribution is invested. For finding the correct model of the probability distributions, in one embodiment, regression analysis and curve fitting are utilized. Other embodiments can also be used, e.g., linear least squares, nonlinear least squares via trust region, and Levenberg-Marquardt or Gauss-Newton algorithms and so on.

In one embodiment, an analytical equation is provided for calculating misdetection probability depending on observed PHY errors, the number of moving windows strategy used for In-band fast sensing, and received signal strength (RSS). Similarly, in another embodiment, a false alarm probability analytical equation can also be derived. Then, Pm can be denoted as the misdetection probability, and Pm can be expressed as, $$P_m = \frac{1}{1+e^{\alpha*(\beta-r)}}$$

where, r is the normalized observed PHY errors, and $\alpha$ and $\beta$ are two regressional parameters. Thus $\alpha$ and $\beta$ are functions of the number of moving windows selected to be used for In-band fast sensing and received signal strength and can then be given by, $$\alpha = f_1(n,S) \text{ and } \beta = f_2(n,S)$$

where, n denotes the number of moving windows and S denotes the received signal strength. In one embodiment, the function of $\alpha$ and $\beta$ can be derived using multivariate regression analysis. However, in other embodiments, similar data models can be used in conjunction with linear, quadratic regression models or any other similar methodologies.

The function of a can be then given by, $$\alpha = \lambda_1\lambda_2 S + {}_3e^{-n}\lambda_4 S^2 + \lambda_5(e^{-n})^2\lambda_6 Se^{-n}$$

where, $\lambda_i$'s are the regression parameters.
Values of $\lambda_i$'s are as follows:

$$\lambda_1=55.1; \lambda_2=-40.7; \lambda_3=405; \lambda_4=9.23; \lambda_5=-342; \lambda_6=-59.4$$

Similarly, The function of $\beta$ can be then given by, $$\beta = \mu_1 + \mu_2 n + \mu_3 e^S + \mu_4(e^S)^2 + \mu_5 n e^S$$

where, $\mu_i$'s are the regression parameters.
Values of $\mu_i$'s are as follows:

$$\mu_1=-0.0717; \mu_2=0.0197; \mu_3=0.0432; \mu_4=-0.00171; \mu_5=0.00225$$

Similarly, the false alarm probability can be expressed as, $$P_f = \frac{1}{1+e^{-\alpha'*(\beta'-r)}}$$

where, r is the normalized observed PHY errors, and $\alpha'$ and $\beta'$ are two regressional parameters. Thus $\alpha'$ and $\beta'$ are functions of number of moving windows used for In-band fast sensing and received signal strength and can then be given by, $$\alpha' = f_1'(n,S) \text{ and } \beta' = f_2'(n,S)$$

where, n denotes the number of moving windows and S denotes the received signal strength.

Once the probabilities of misdetection and false alarm are calculated depending on observed PHY errors, the n-moving window strategy and received signal strength, the aim is to find out the dynamic optimized threshold such that the probabilities of misdetection and false alarm are minimized. At any stage of the sensing, when a cognitive radio makes a wrong decision about a primary incumbent (sensing failure), it faces one of two possible costs in terms of time units. If the wrong decision results in misdetection, the cost (penalty) on the cognitive radio will be primary network policy specific and the cognitive radio will be blocked from spectrum access for a certain time.

Assume the cost can be quantified as time units consumed. Assume this cost as $C_1$. On the other hand, if the wrong decision results in false alarm, the cognitive radio chooses to switch to some other clear band and it faces a cost of finding a clear spectrum band, which can also be quantified as time units consumed. Assume this cost to be $C_2$. Once the probabilities of misdetection and false alarm are calculated depending on observed PHY errors, n-moving window strategy and received signal strength, the aim is to find out the dynamic optimized threshold such that the penalty due to misdetections and false alarms is minimized. The optimization problem now becomes minimization of the total expected cost as given by $E(C)=C_1 \times P_m + C_2 \times P_f$. Expanding E(C), it can be written as $$E(C)=C_1/[1+e^{\alpha(\beta-r)}]+C_2/[1+e^{-\alpha'(\beta'-r)}]$$

To find out the dynamic optimized threshold, r, the first derivative of this equation with respect to r is equated to 0, as given in $$C_1\alpha e^{\alpha(\beta-r)}/[1+e^{\alpha(\beta-r)}]^2 - C_2\alpha'e^{-\alpha'(\beta'-r)}/[1+e^{-\alpha'(\beta'-r)}]_2=0.$$

Solving mathematical derivations, one finds the optimized threshold, r=r*, such that it is satisfied by, $$\cos h(\alpha(\beta-r^*)/2)/\cos h(\alpha'(\beta'-r^*)/2) = \sqrt{(\alpha C_1/\alpha'C_2)}.$$

The second order differentiation, $d^2E(C)/dr^2$, can be shown to be positive (with simple derivations), proving the function E(C) to be convex with respect to r. This also proves that the optimal value of r=r* is the desired minimization for the total expected cost E(C). Similarly, in other embodiments, other approaches, e.g., sole minimization of misdetection probability or sole minimization of false alarm probability or equal weighting minimization objectives, can be used.

Out-Band Fine Sensing

Figure 6:
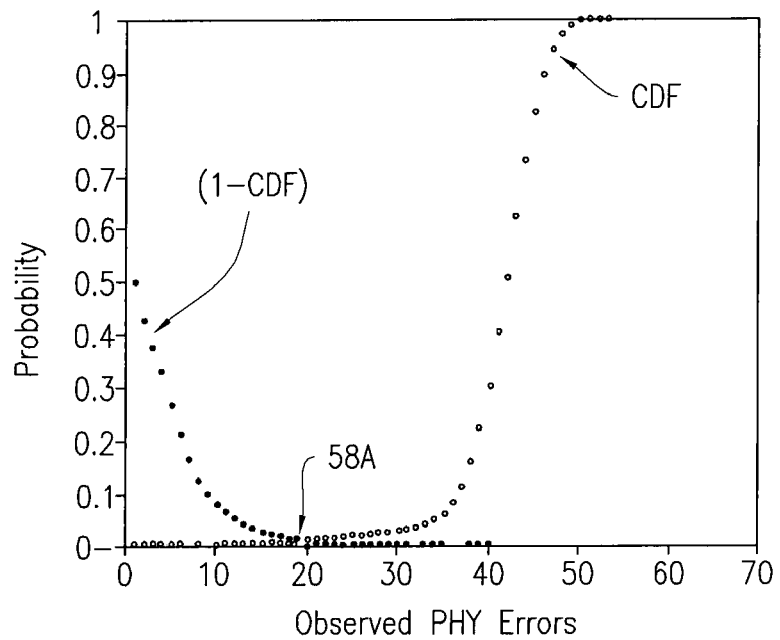
FIG. 6 is a graph showing the functional relationship of false alarm and misdetection probability vs. PHY errors threshold for a 1-window sensing strategy (out-band fine sensing)

In a similar approach to In-band fast sensing, similar experiments and analysis are performed for out-band fine sensing. FIG. 6 depicts the cumulative distribution function (CDF) and complementary cumulative distribution function (1-CDF) of the observed PHY errors of case (i) when a primary incumbent is present and case (ii) when the primary incumbent is not present, respectively, based upon the experimentally observed data. The sensing window duration is assumed as 1, i.e., the experimentally observed data are calculated over the sensing duration T2. With out-band fine sensing, cognitive radios do not communicate so the observed PHY error is less suppressed here. In one embodiment, the experimental results are provided where T2 is assumed to be the same as T1 from In-band sensing. However, another embodiment can also be used where T2 is greater than or smaller than T1.

Figure 7:
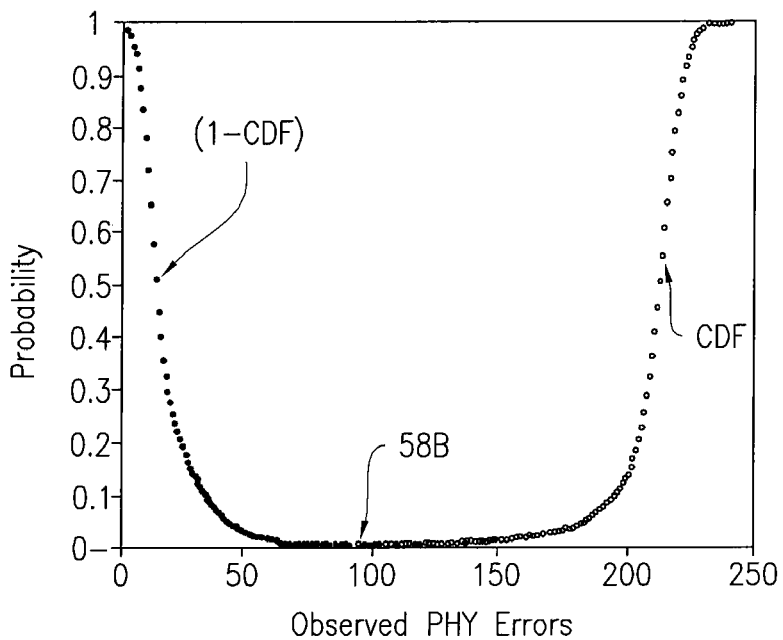
FIG. 7 is a graph showing the functional relationship of false alarm and misdetection probability vs. PHY errors threshold for 5-window sensing strategy (out-band fine sensing)

As evident from FIG. 6, the minimized error probability corresponding to the intersection 58A of the two curves CDF and (1-CDF) is much less than that of the In-band sensing experimental observations with 1-window duration. FIG. 7 shows the out-of-band sensing results with a 5-moving window strategy, with the minimized error probability corresponding to the intersection 58B of the two curves CDF and (1-CDF) being less than that of the out-of band sensing experimental observations with 1-window duration.

Similar to the analytical method presented in In-band sensing, the same approach is utilized to find out the misdetection and false alarm probability distribution and the optimized threshold depending on observed PHY errors, n-moving window strategy, and received signal strength.

Figure 8:
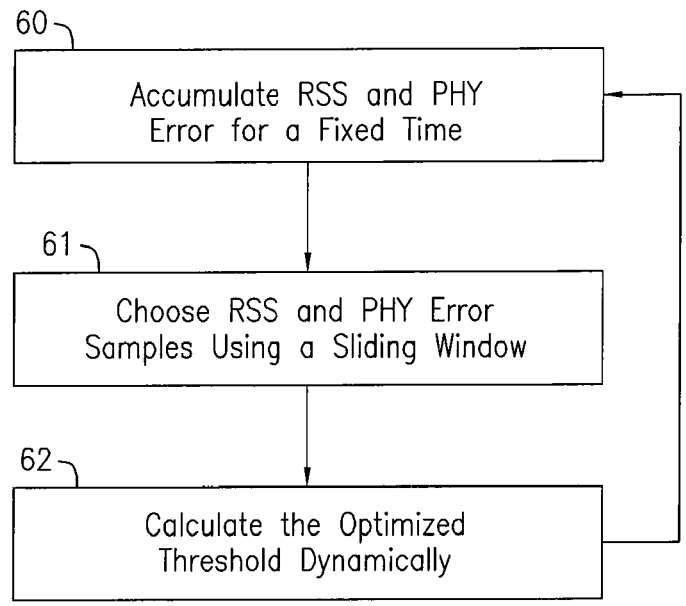
FIG. 8 is a flow diagram showing an optimized dynamic threshold calculation process.
Figure 9:
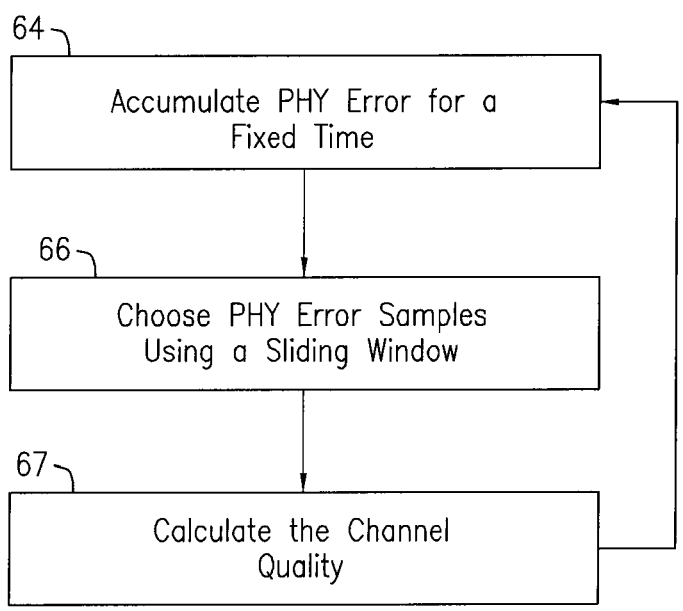
FIG. 9 is a flow diagram showing a channel quality evaluation process.

FIG. 8 illustrates processes to sense the channel and compute the optimized dynamic threshold 36 for detection. The RSS and PHY errors are sensed and the values are accumulated in step 60. The RSS and PHY Error Samples are chosen using a sliding window in step 61. The dynamic optimized threshold 36 is calculated in process step 62 (i.e., where r=r* is minimized for the total expected cost E(C) equation described above). The accumulated PHY error value (i.e., the dynamic optimized threshold 36 determined in step 62) is used to compute the channel quality. More particularly, FIG. 9 shows the process steps involved in computing the channel quality (i.e., a measurement based on parameters such as PHY errors, CRC errors, RSS, etc.). The PHY errors are accumulated for a fixed time at process step 64, and placed into a sliding window comprising n-windows at process step 66. Channel quality can then be computed in process step 67, with a higher PHY error value indicating a lower channel quality.

Figure 10:
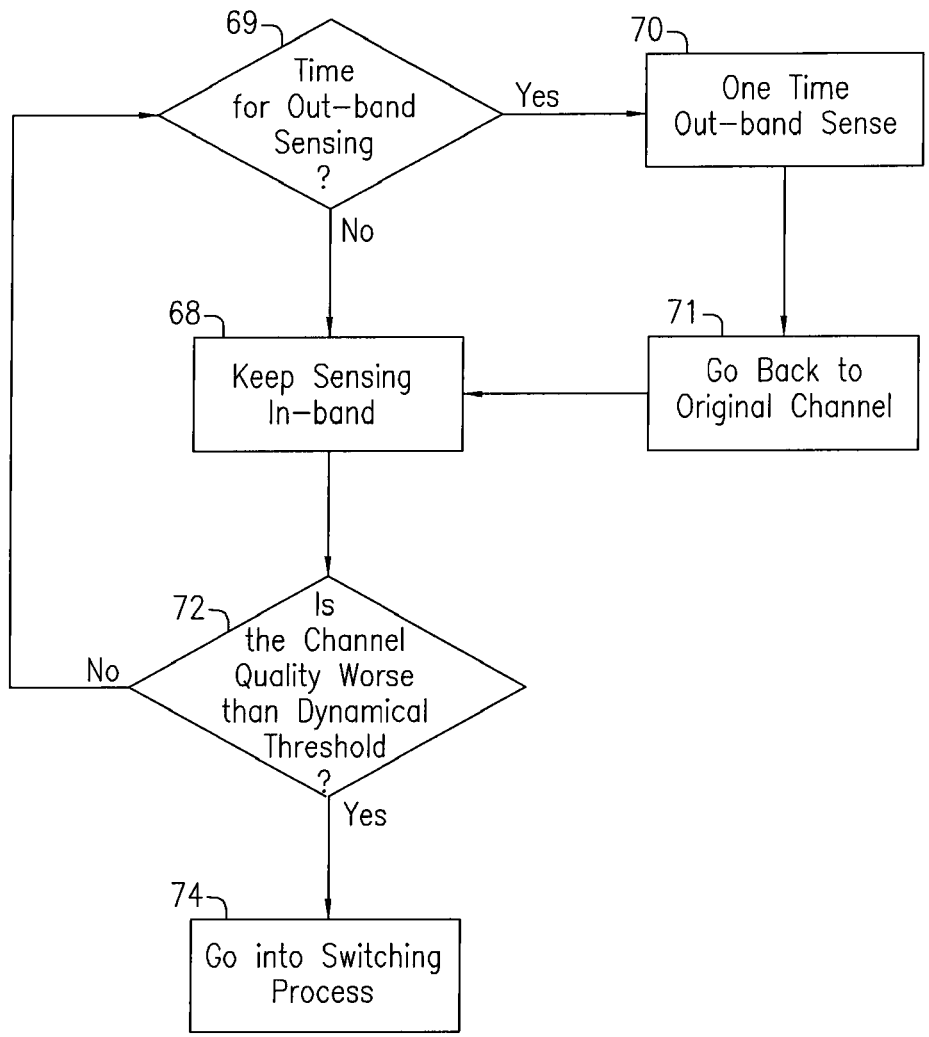
FIG. 10 is a flow diagram showing in-band sensing and out-band sensing process flows.

FIG. 10 shows the process steps involved in a channel sense and a switch process. Initially, in block 69 there is a determination as to whether out-band sensing is in effect. If not, step 68 involves in-band sensing, to keep in-band sensing going, and, if so, step 70 involves out-band sensing, to initiate a one time out-bound sensing event, after which, in block 71, the process returns to the original channel. If, at step 72, the accumulation of PHY errors is greater than the dynamic optimized threshold 36, (i.e., the channel quality is worse than the channel quality determined at the dynamic optimized threshold 36) then the trigger to begin switching occurs in step 74. If not, then the process returns to step 69.

Methodology for Synchronization and Dynamic Spectrum Access

Once the trigger to begin switching occurs (i.e., switch/move following sensing/detecting a primary incumbent), switching and re-synchronization must occur rapidly. The processes for efficient dynamic spectrum access and channel switching and synchronization are described below.

Special Purpose Hardware Queues Design

The two special hardware queues, the synch queue 24 and the data buffer queue 26 (i.e., discussed above in relation to the HAL interface layer 18 in FIG. 1) become active whenever any dynamic channel switching is triggered. The synch queue 24 is used for transmitting synchronization management frames. The synchronization management frames are special purpose frames, as depicted by arrows 1-3 in FIG. 11, and are used for synchronization between the communicating nodes at the time of switching. Whenever any of the communicating cognitive radio nodes sense the necessity of channel switching (becoming a switching initiator node), the node then enables the sync queue 24 and triggers a channel switching request management frame 40 simultaneously with the ongoing data communication. Inside the synchronization management frame 40, the destination channel information is provided (i.e., candidate frequency channel(s)) to which the CR nodes desire to switch to upon vacating the current channel.

Figure 12:
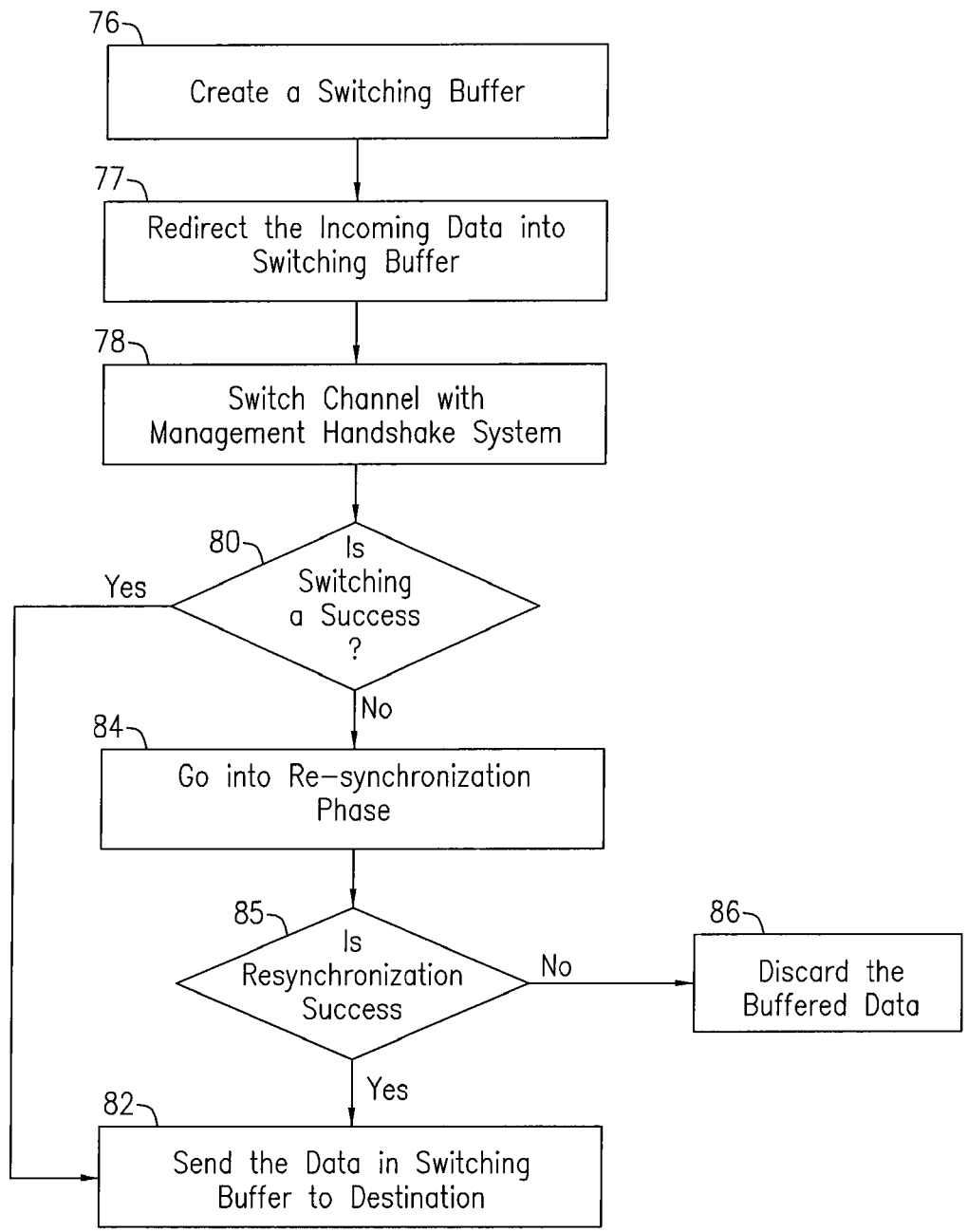
FIG. 12 is a flow diagram showing a channel switching progress.

FIG. 12 shows the process steps involved during channel switching. More particularly, if a channel switch event is triggered (as shown in process step 74 in FIG. 10) then a switching buffer (not shown) implemented in software is first created at step 76. The switching buffer includes the software buffer (not shown) and the data buffer queue 26. The upper layer 14 data is temporarily stored in the data buffer queue 26. Incoming data is redirected into a switching buffer in step 77. The handshaking process for channel switching between the transmitter and the receiver is triggered at process step 78. If the channel switching is determined to have been successful at process step 80, then the data stored in the data buffer queue 26 portion of the switching buffer is transmitted to the receiver in process 82. If the switching fails, then the re-synchronization process is triggered at process step 84. If the re-synchronization process is successful as determined in step 85 then the buffered data in the data buffer queue 26 is transmitted to the receiver at step 82. If this process fails then the buffered data stored in the data buffer queue 26 is discarded in process step 86.

The data buffer queue 26 is enabled when the communicating CR nodes are physically switching channels and the MAC layers 12 are being configured with the transmission and reception parameters in the new frequency band. With data buffer queue 26 enabled, a local memory for buffering the data temporarily from the upper layers 14 is established so that no data from upper layers 14 will be lost and the switching scheme will not create any adverse effect.

With the synch queue 24 and the data buffer queue 26, dynamic channel switching in the MAC layer 22 is hidden from the upper layers 14. As a result, upper layer 14 functionalities are not affected at all, thus enabling a smooth, seamless switching.

Figure 11:
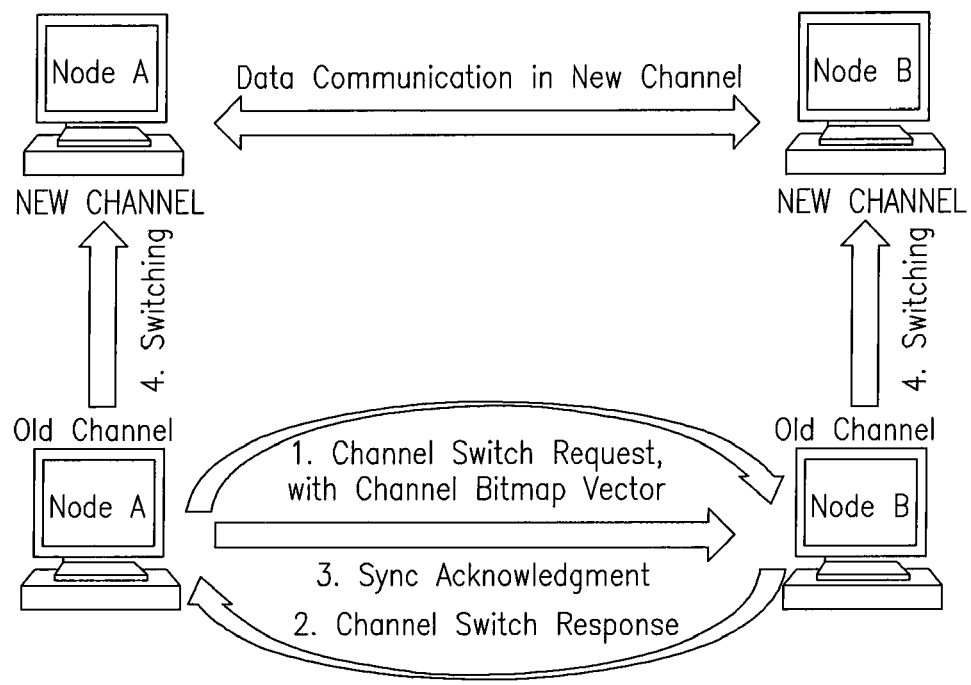
FIG. 11 is a diagram depicting dynamic frequency switching with a bitmap vector enabled channel switching request and response management frame.

Special Purpose Synchronization Management Frame and Multiple Candidate Frequencies FIG. 11 shows the processes of sensing, sending the channel switching request management frame 40, receiving a response to the request, and the re-synchronizing of the nodes. More particularly, cognitive radio nodes may experience functional problems caused by a hidden incumbent. To fully understand the hidden incumbent problem, consider that two cognitive radios (node A and node B) are communicating with each other using a specific frequency channel and an incumbent returns to the same frequency channel. Successfully sensing the primary incumbent, suppose, node A transmits the channel switching request management frame 40 (see arrow 1). The channel switching request management frame 40 will contain the information of a channel which node A assumes to be not used by any incumbent and intends to move to. However, node B might not have that channel as vacant as some other primary incumbent might be using that channel in the vicinity.

This information may be unreachable to node A (e.g., because of signal interference) making this a hidden incumbent problem. Thus if node A sends its vacant channel information to B and switches straightaway, two situations might appear because of the hidden incumbent problem: (i) node B will not be able to respond to this request, i.e., will not be able to switch to the new frequency node A has suggested, or (ii) node B will respond to this request, i.e., will switch to the new frequency node A has suggested. In the first instance this will result in loss of communication between node A and node B. In the second instance this will result in breaching the primary incumbent avoidance policy as node B's communication will now interfere with the primary incumbent in the new frequency.

To address the hidden incumbent problem, the channel switching request management frame 40 uses multiple available frequency information (i.e., multiple candidate frequencies) inside the destination channel bitmap 44 in the channel switching request management frame 40. The number of candidate frequencies is updated dynamically by the initiator node depending on the feedback received from the receiving communicating CR node. The reason behind transmitting a synchronization message with multiple candidate frequencies is that even if the receiving CR node encounters a licensed incumbent transmission (hidden to the initiator CR node), it still has ways to choose another candidate channel and report this incumbent transmission to the initiator using a similar management frame called a channel switch response management frame. The channel switch response management frame (see arrow 2) and the synch acknowledgement frame (see arrow 3) are similar to the channel switching request management frame 40, except the subtype identification 54 fields (see FIG. 3) are set to a particular value to identify them as either a channel switch response management frame or a synch acknowledgement frame. In the case of multiple responses, the subtype identification field 54 along with the switch count field 48 (see FIG. 3) are utilized. With this mechanism, even with the presence of a hidden incumbent node, the risk of synchronization failure is reduced significantly.

Destination Bitmap Channel Vector

With primary devices dynamically accessing the primary bands, the availability of the spectrum bands for cognitive radio node operations changes dynamically. Multiple candidate frequency channels sent by initiator nodes may be used; however embedding absolute information (spectrum band frequency) of candidate frequency channels would invoke the challenge of a variable length management frame. This would result in the management frames utilizing more time to decode as more processing of header information would be necessary for variable length frames. This may adversely affect communication throughput.

In order to solve this issue, the destination channel bitmap vector 46 is utilized for sending candidate channel(s) information. Assuming that there are a total of N spectrum bands in the vicinity of the cognitive radio network, any or some or all of which can become available at any time and could act as candidate channel(s). The length of the destination channel bitmap 44 uses two bytes in the frame body 42. More particularly, when a candidate channel is available, the corresponding bit in the destination channel bitmap vector 46 is set to 1; otherwise, it is set to 0.

An advantage of using the destination channel bitmap vector 46 for transmitting candidate frequency information is that the fixed length channel switching request management frame 40 can be used even with the dynamic availability of candidate frequency information, which makes it sufficiently easy and quick to decode. Moreover, with the usage of the destination channel bitmap vector 46, the management frame 40 becomes easily scalable. For instance, if there are more than 16 non-overlapping channels in any system, the destination channel bitmap vector 46, can be expanded. The switch count 48 field in the frame body 42 indicates when the initiator node will timeout from the current synchronization mechanism (if no synchronization could be established; i.e., even after multiple switching requests, no response frame is received from the other communicating CR node) and will vacate the current channel.

Dynamic Synchronization Between Communicating Cognitive Radio Nodes

Figure 13:
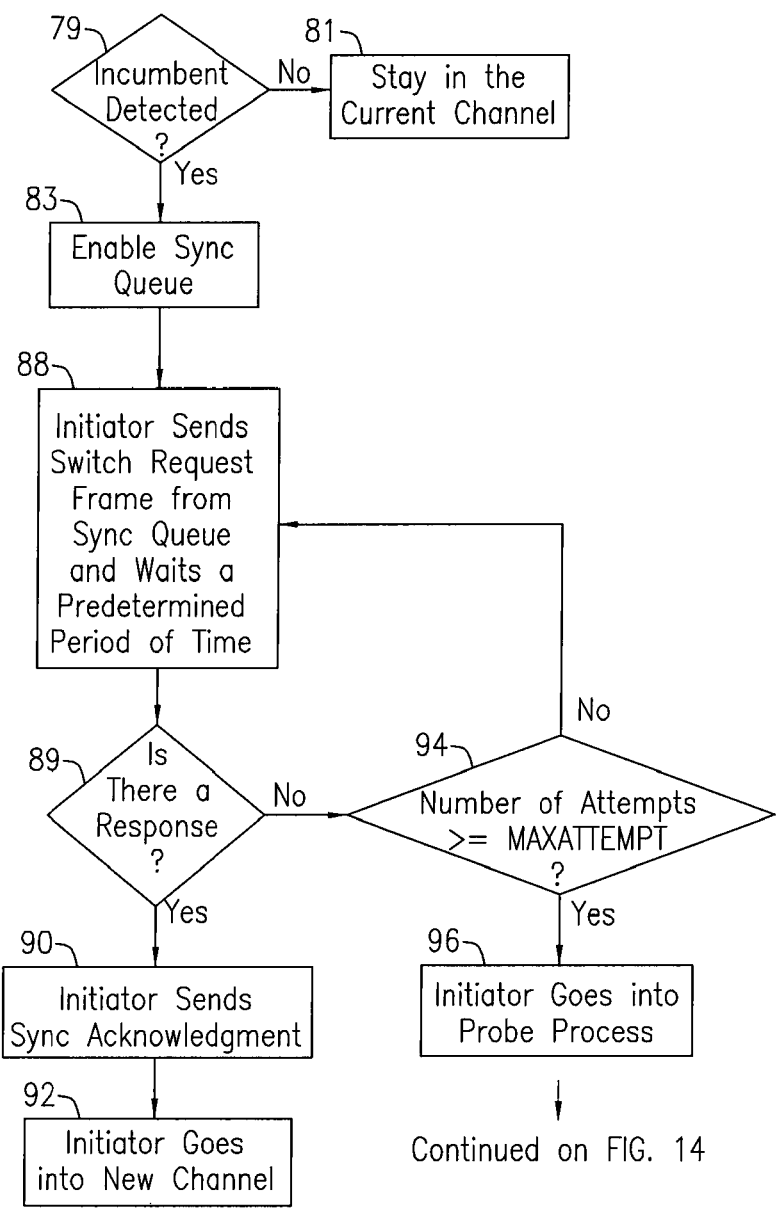
FIG. 13 is a flow diagram showing a switching request flow chart from an initiator's perspective.
Figure 14:
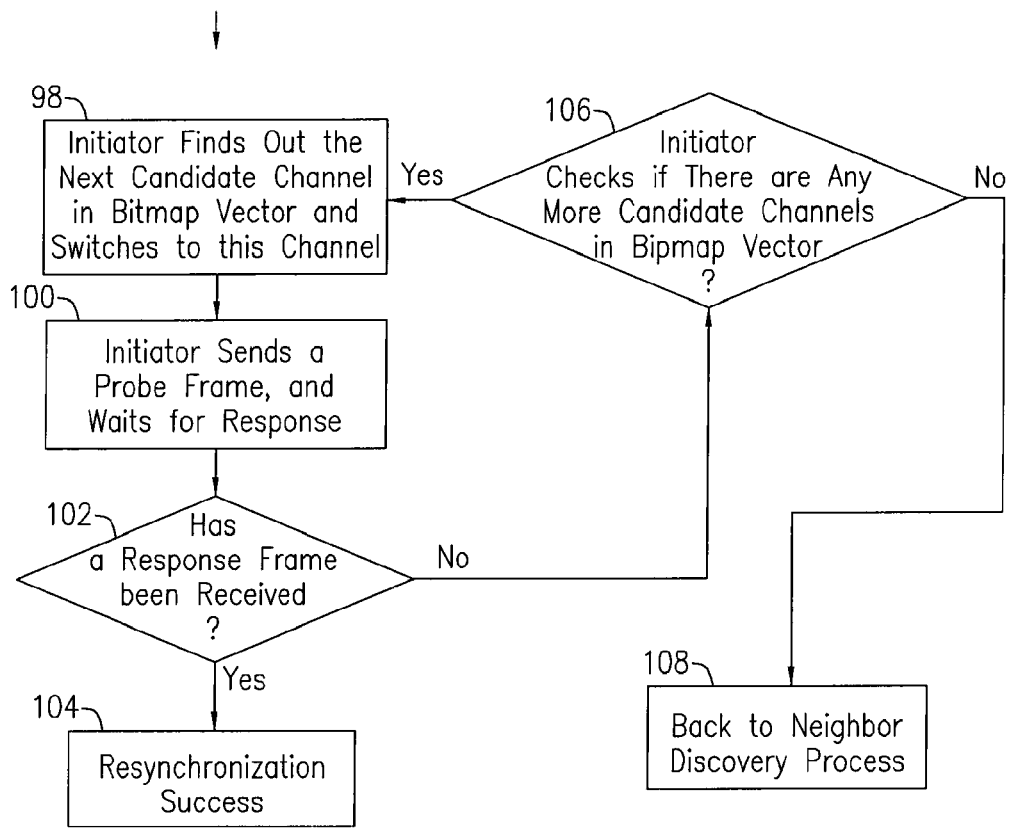
FIG. 14 is a flow diagram showing a re-synchronization phase through quick probing.

Referring to FIGS. 13 and 14, the process flows for dynamic channel switching are shown. The channel switching procedure is divided into two phases. The initial phase establishes the synchronization through multiple attempts (if needed) of management frame handshaking and enables the communicating nodes to switch channel successfully. If an initial phase failure happens, the second phase acts as a quick rescue process, which introduces a channel quick probing mechanism that takes charge of re-synchronization of both the nodes. Both phases are described below.

Initial Synchronization Phase—Phase 1

In this method, synchronization is not dependent solely on synchronization of the management frame 40 from one of the two communicating CR nodes. Rather, the process of synchronization with both channel switching request management frame 40 (from the initiator) and response management frames (from the receiver) is provided. When a channel switching action is needed (sensed by any of the communicating CR nodes), that node (initiator) will send a switch request 40, including a destination channel bitmap vector 46 in the payload.

However, there is a possibility that both the nodes in communication detect the arrival of an incumbent device, and both become initiators and initiate channel switch request management frames 40 with information about the candidate channel(s) in their destination channel bitmap vectors 46. This might cause a clash in the synchronization mechanism. However, this problem is solved by reference to the channel switching request management frame 40 time stamp 52 field which indicates when the request was generated. If both the CR nodes initiate channel switch request management frames 40, the one with earlier timestamp will win. The time stamps 52 will permit both of the nodes to decide on the winner (initiator) and other node will automatically follow the role of receiver.

Referring again to FIG. 11, upon reception of a channel switching request management frame (see arrow 1), the receiver (node B) then decides on the new channel to switch to (deciding from the destination channel bitmap vector 46) and initiates a channel switching response management frame back to the initiator (node A) (see arrow 2). With this channel switching response management frame, the initiator and the receiver have now mutually agreed upon the destination channel to which they would move. As the last step of the handshaking procedure the initiator sends out a quick synchronization frame acknowledgment (see arrow 3) to the receiver and moves to the new channel. The receiver upon receiving the synchronization frame also immediately moves to the new channel.

As shown in FIG. 13, the initiator will determine whether it has detected an incumbent in step 79 and, if not, it will remain on the channel as indicated in step 81. If it has, it will enable the sync queue in block 83 and send a switch request frame in block 88. After the initial channel switching response management frame is transmitted at step 88, a response timer is set up to run for a maximum attempt time (also at step 88). When the initiator receives the switch response frame, as indicated in step 89, it will send a sync acknowledgement frame, and then switch into destination channel immediately as depicted in steps 90 and 92.

However, if there is no response frame received within the response time, as indicated in step 89, the initiator will confirm the attempt times and the final timeout switching time, as indicated in steps 94 and 96. In one embodiment, the maximum attempt time is set to be three and the final timeout switching time to be five times the estimated single round trip timeout (steps 88 and 94). Thus if the timing permits and if the number of attempts made is less than 3, the initiator node will repeat the switch request, setup the response timer, wait for the timer to expire and look for the response frame again. However, in other arrangements, maximum attempt times could also be made 2, 4, 5 etc. and final timeout switching time may be varied.

Channel Switching Request Management Frame Transmission Scheme

The transmission of a dynamic variable number of channel switch request management frames 40 are provided for in each of the multiple synchronization attempts. In one scheme, two management frame transmission schemes like (1,1,1) and (1,2,3) are compared. For example, the (1,1,1) scheme uses 1 management frame 40 in each of the three synchronization attempt(s). On the other hand, the (1,2,3) scheme uses three attempts of synchronization with 1 frame transmitted in the first attempt, 2 frames in the second attempt and 3 frames in the third and final attempt. Such a (1,2,3) scheme presents more robustness in terms of redundancy than a (1,1,1) scheme, however, at the same time, it introduces more management frames (overhead) than the (1,1,1) scheme. Obviously, (1,1,3) or (1,3,5) or similar transmission schemes could also be used and the tradeoffs may be evaluated. In contrast, if the attempts made are equal to the maximum allowable number of attempts and still no response frame is received even after the response timer has expired, this node will go into the second phase of the channel switching mechanism, i.e., quick probing and re-synchronization at step 96 in FIG. 13.

The initial synchronization phase 1 may fail (even after multiple attempts) due to one of the two following reasons.

First, all the switching request frames themselves are lost (though this is a very unlikely case resulting in a fatal scenario of synchronization failure in which case the CR nodes may end up in different spectrum bands resulting in loss of communication. The receiver node does not have any information about the candidate channel(s).

Second, the receiver may have received the switching request frame(s) 40 from the initiator, but the response frame got lost in all the response attempts (i.e., the receiver node would understand this if it does not receive any sync message from the initiator). However, the receiver now at least has the knowledge of the candidate channel(s) and the final timeout switching time from the initiator's perspective. The receiver then moves to one of the suitable candidate channels.

When the attempts made are equal to the maximum allowable number of attempts and still no response frame is received even after the response timer expired, the initiator does not have any knowledge of whether the receiver has received the desired information. Thus the initiator assumes this to be a synchronization failure, times out, vacates the current channel and starts the re-synchronization attempt through a quick probing process at step 96 of FIG. 13. The quick probing is described below, in Phase 2.

Re-Synchronization Phase Through Quick Probing—Phase 2

FIG. 14 illustrates the process steps necessary to re-synchronize two nodes if initial Phase 1 failure happens. Even if the synchronization failure happens, it is not desired for the communicating CR nodes to go to the neighbor discovery process (i.e., scan to rebuild the neighbor table) straightaway because of the highly time consuming nature of the process. Thus quick probing is provided as a middle of the road path rescue process through Phase 2.

At step 98, the initiator selects the candidate channel(s) from the destination channel bitmap vector 46 for the purpose of quick probing, e.g., the next candidate channel in the bitmap vector. The initiator will go to this first candidate channel, transmit a quick probe management frame 40 and try to sense if there is any probe response from the receiver (see process steps 100 and 102). If it receives a probe response (i.e., the probed channel is clear of incumbent operation) both nodes will be re-synchronized at step 104; otherwise the initiator moves onto the next candidate channel (see process step 106). This process will be repeated until probe response is received in one of the candidate channels or all the candidate channels are scanned. After all candidate channels are scanned the CR nodes will go to the neighbor discovery process at step 108.

Actual CR prototype testing has been conducted. The test bed setup and experimental results are described below.

Test Bed Setup and Experimental Results

Extensive experiments for evaluating the implementation of the CR prototype system with a dynamic channel switching process have been conducted. Other embodiments may also be used. For performance evaluation purpose, the focus was on four metrics—average synchronization attempts, average time to synchronize, effective throughout and management frame overhead. In this regard, both the management frame transmission schemes, (1,1,1) and (1,2,3) were compared.

Test Bed Setup

CR nodes (laptops) were setup in a region of radius 25 meters, communicating with TCP data stream and are enabled with a dynamic channel switching process. To conduct extensive testing under different channel congestion environments, experiments under different network traffic scenarios in the presence of other communicating nodes in both indoor and outdoor environments were conducted. Each laptop, running a Linux 2.6 operating system, was equipped with an Orinoco 802.11a/b/g PCMCIA wireless card. These Orinoco devices were equipped with Atheros 5212 (802.11 a/b/g) chipsets. The TX powers of these wireless devices were set to 100 mW. In this test bed, cordless phones are emulated as a primary license holder such that whenever any cordless phone accesses any channel that the cognitive radio is operating on, the cognitive radio node upon successful sensing/detection should vacate that channel and move to a new channel.

Experimental Results

Figure 15:
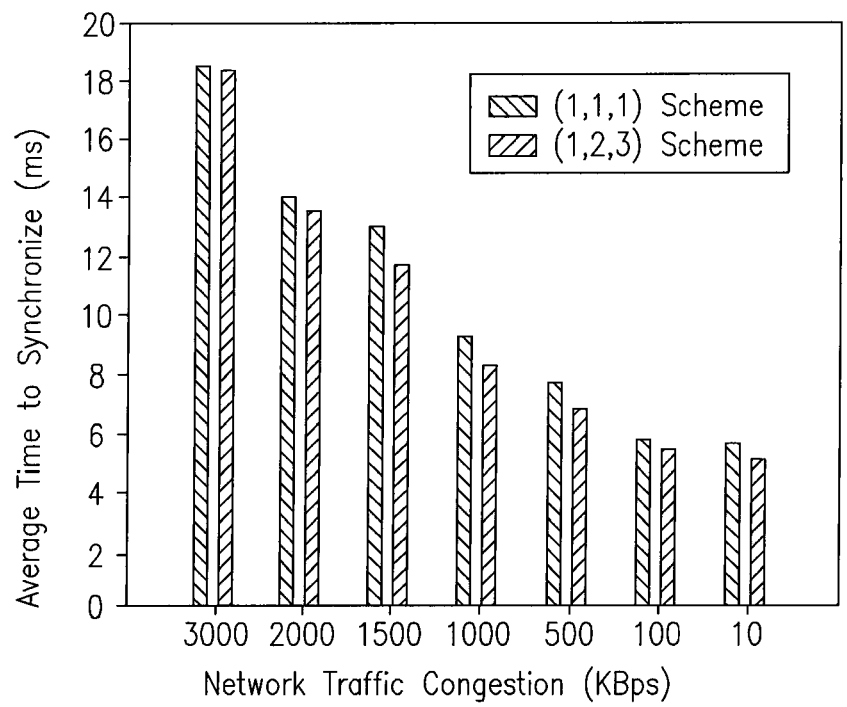
FIG. 15 is a graph showing average synchronization time under various network traffic situations, including with (1,1,1) and (1,2,3) schemes.

To provide a better insight into the results, the average (averaged over 2000 instances of switching for each of the experiments) switch and synchronization times for different network congestion states and under both (1,1,1) and (1,2,3) schemes were compared (see FIG. 15). Seven (7) different network congestion states were considered. It is evident from the results that with network traffic congestion decreasing, average time to synchronize also decreases for both the mechanisms as a lesser number of synchronization attempts were required with low network traffic congestion. Moreover, it is seen from the comparisons that a (1,2,3) scheme produced better results than a (1,1,1) scheme in terms of average time required. However, another interesting observation from the comparison was that, when the network congestion state was very high (approx. 3 MB/s or 2 MB/s), there was not much difference between the (1,2,3) and the (1,1,1) schemes. The difference increases as the network congestion state was medium (approx. 1.5 MB/s–0.5 MB/s), where the (1,2,3) scheme produces significantly better results than the (1,1,1) scheme. Again the difference decreases when the network congestion state is low (approx. 100 KB/s or 10 KB/s).

Figure 16A:
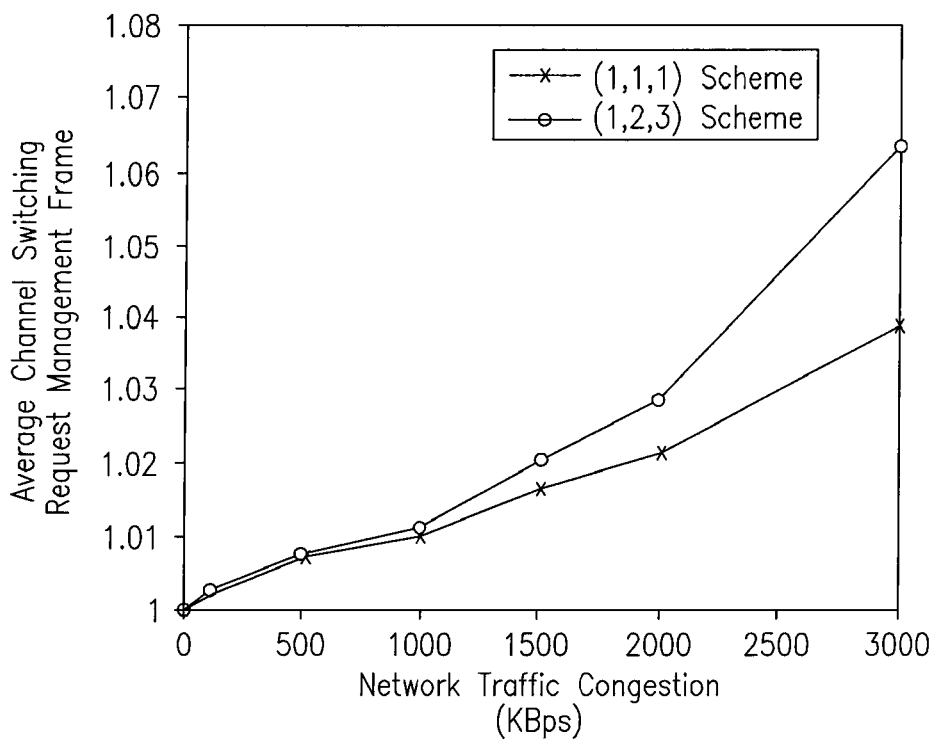
FIG. 16a is a graph showing an average of channel switching request management frames required.
Figure 16B:
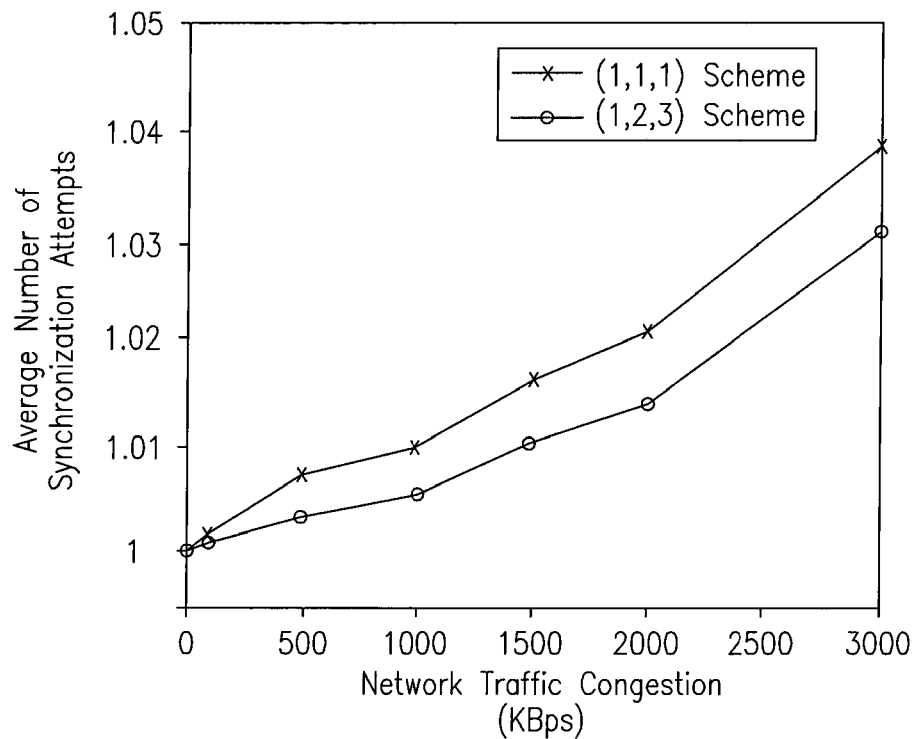
FIG. 16b is a graph showing an average of synchronization attempts under various network traffic situations, including with (1,1,1) and (1,2,3) scheme.

FIGS. 16a and 16b show the comparison results of average number of channel switching request management frames 40 required and average number of synchronization attempts made for each of the dynamic channel switching attempts under both the (1,1,1) and (1,2,3) schemes. The comparison was made under all 7 different types of network congestion states specified above. It was observed from the results that, though the average number of switching request management frames 40 (overhead) required to synchronize in each switching was slightly greater in case of the (1,2,3) scheme, the average number of synchronization attempts made under the (1,2,3) scheme is lesser than the (1,1,1) scheme, thus resulting in less average time to switch and synchronize as seen FIGS. 16a and 16b.

Figure 17:
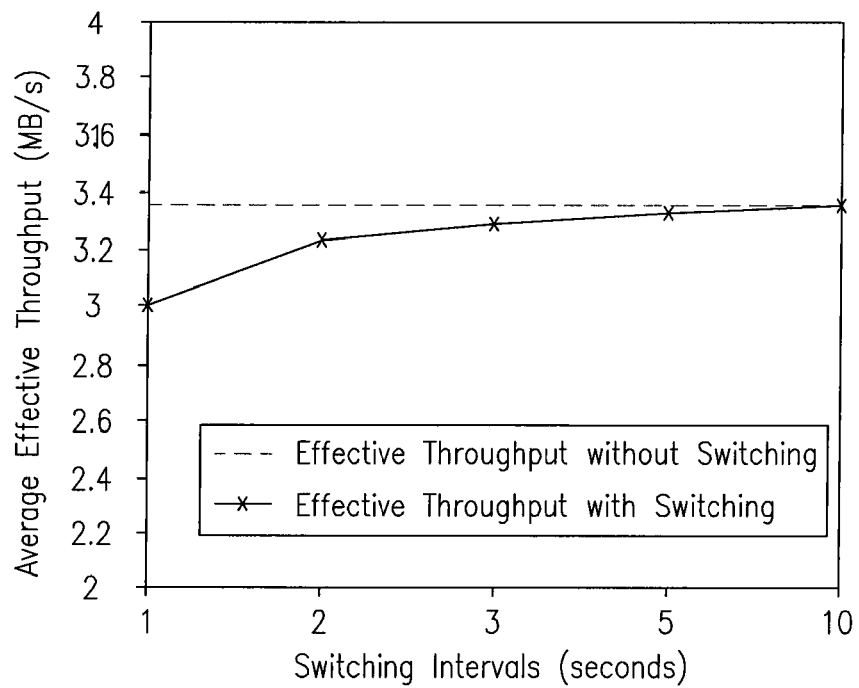
FIG. 17 is a graph showing an average effective throughput with various frequency intervals.

Finally, FIG. 17 shows the effective throughput achieved in the CR prototype with the dynamic switching process. The experiment was conducted to evaluate the performance of the system and its effect on the data throughput. The results were plotted against different switching intervals (1, 2, 3, 5 and 10 seconds). For benchmarking purposes, the ideal maximum throughout achieved under the same environment and conditions without any frequency switching was calculated. The dotted line in FIG. 17 depicts the maximum possible throughput (3.353 MB/second—benchmark). As evident from FIG. 17, the CR system demonstrates high throughput even with very highly frequent switching and, as obvious, with less frequent switching (switching every 5 seconds or 10 seconds), the throughput achieved was almost same as the benchmark throughput, evidencing the effectiveness of the CR prototype.

Generalized Modeling Methodology

Figure 18:
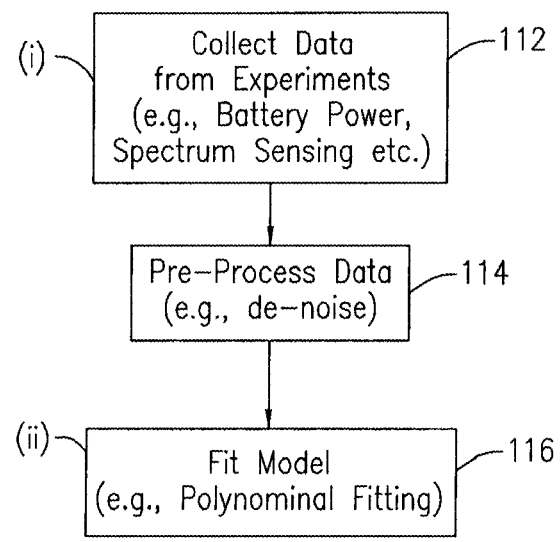
FIG. 18 is an abbreviated flow diagram depicting some of the processes involved in a generalized modeling methodology.

The modeling methodology described above (i.e., in relation to establishing the dynamic optimized thresholds 36 for in-band and out-band sensing) may be used to optimize other processes such as optimal battery power/utilization for the most efficient use of the energy stored in a battery, or optimizing operational activities to minimize operational delays. Referring to FIG. 18, which shows schematically and in block diagram flow diagram form, by way of an example, process steps for optimizing the utilization of network resources, wherein some of the many steps described in the present application (e.g., in the section entitled "Empirical Derivation of the Dynamic Optimized Threshold"), are depicted. For instance, at step 112 data may be collected from experimental tests. The empirical data may be enhanced, such as by removal of noise and the like in step 114. Then the data may be mathematically modeled at step 116, e.g., by curve fitting (i.e., describing the empirical data in an algorithm or equation through the use of polynomial fitting or multivariate regression analysis). Such models may be utilized as noted in the present application to determine best channel performance, such as an error rate below some pre-determined threshold, and this may be done dynamically to account for changes in such things as channel performance over time.

Having modeled a network parameter, such as channel performance, the system may proceed to derive many important benefits other than simply selecting the next channel or alternative channels to use. Optimization of the utilization of network resources can be accomplished with this same information or like information derived from continuing and dynamic analysis of network performance and the like. Given channel characteristics, such as quality, traffic and the like, along with such information as battery performance specifications, models, curves and the like or combinations thereof, battery performance for devices on the network may be optimized or at least improved. Optimum or at least improved data rates may be achieved. Continuity of connection performance can be optimized or at least improved. Whether a mode of operation, such as the constitution of an ad hoc or mesh network is practicable or sustainable, and likely for how long, and how to constitute/reconstitute the mesh as parameters change over time may be determined and optimized or at least improved. Many other steps can be involved in the modeling methodology in addition to the steps depicted in FIG. 18, and many other network resource/performance parameters may be optimized or at least improved.

Figure 21:
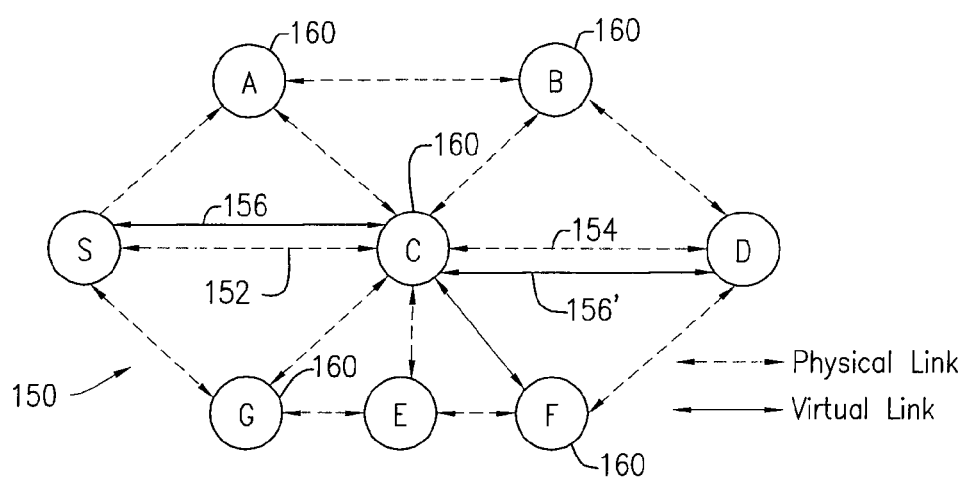
FIG. 21 illustrates an example of a wireless mesh network within which aspects of the disclosed subject matter may be utilized.

FIG. 21 illustrates an example mesh network 150 within which aspects of the disclosed subject matter may be utilized. Nodes 160, S and C in this example are illustrated schematically to be within the communication range of each other. That is, a physical link 152 between nodes S and C exists. Then, these two nodes can communicate with each other over this physical link 152, e.g. by using a legacy IEEE 802.11 MAC protocol or any other MAC protocol.

The nodes S and D are not within communication range of each other. However, physical links 156, 156' do exist between node pairs S-C and C-D, respectively. These two physical links, combined to obtain a "virtual link", allow a logical link to be obtained between nodes S and D. Then it is possible for S and D to communicate with each other directly, thus minimizing the need for intermediate router functionalities being performed, thereby also reducing the delays discussed above.

Figures 19, 20:
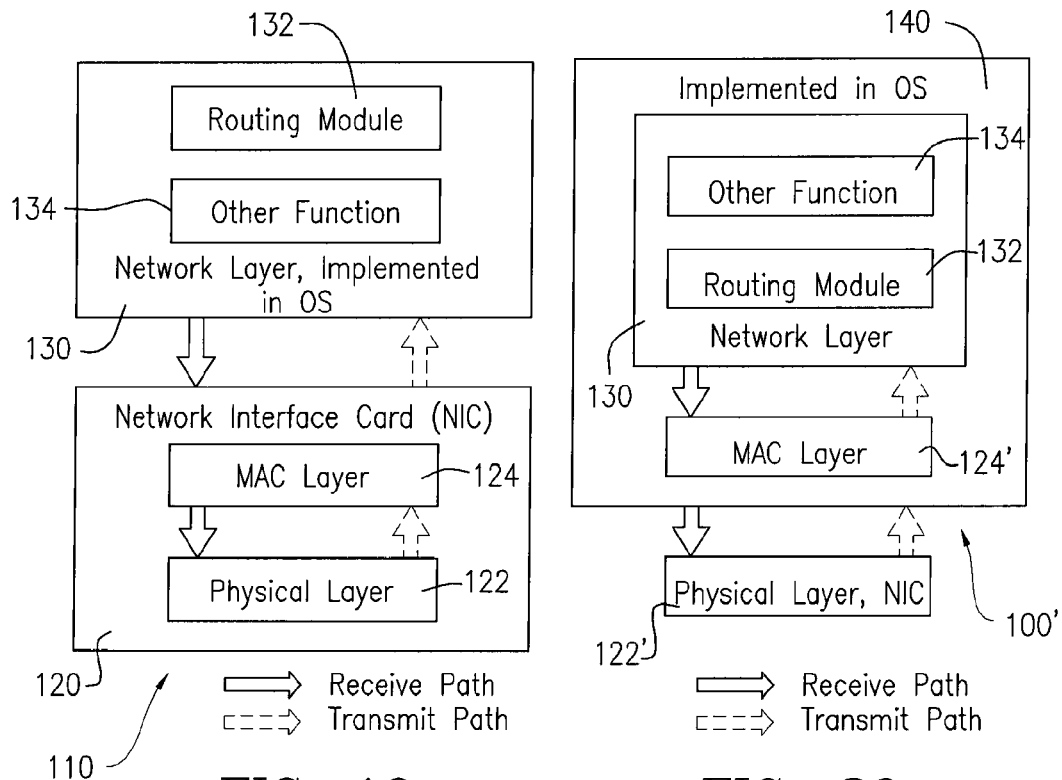
FIG. 19 shows a typical processing path and the system structure for a wired network like the Ethernet.
FIG. 20 shows the same typical process as FIG. 19 for a wireless network protocol stack, such as wireless Ethernet.

By extending this idea of virtual links, any two nodes 160 in FIG. 21 could communicate with each other. The proposed MAC protocol can establish and maintain virtual links automatically and efficiently. Under the proposed method, the routing layer 132 (see FIG. 20) would be still responsible for the task of maintaining the routing table; however, the task for data frame re-encapsulation can be done by the virtual link MAC, e.g., MAC layer 124' in FIG. 21.

Applicants propose a system structure, which may be implemented in an IEEE 802.11 based MAC. In addition to the standard 802.11, MAC, two extra modules are proposed to be created in the wireless MAC Layer 124', illustrated schematically and in block diagram form, by way of an example, in FIG. 26. The two new modules are an Inbound Monitor module 310 and Self-Learning module 312.

Figure 22:
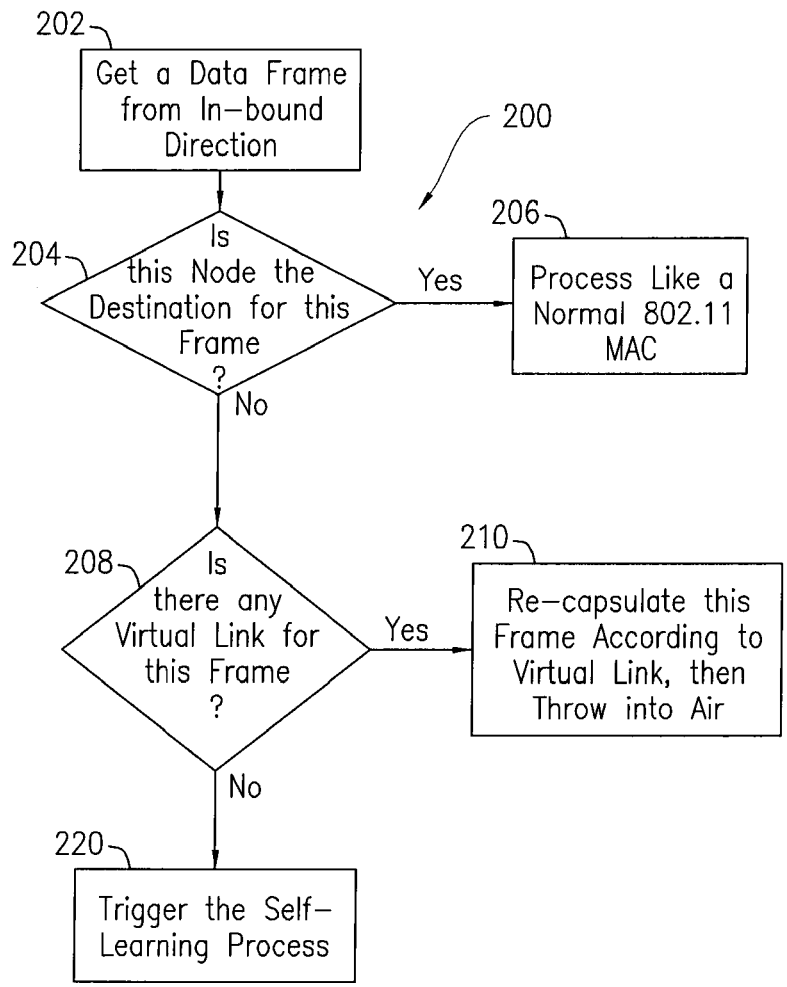
FIG. 22 illustrates schematically and in block diagram flow chart diagram form an example of process steps for creating a virtual link according to aspects of the disclosed subject matter.

The steps for creating a virtual link can be as follows, as illustrated schematically and in flow chart block diagram form, and by way of an example, in FIG. 22. When the wireless MAC layer 124' starts to run in a node 160, the MAC layer 124' IP address is noted and the Inbound Monitor module 310 also starts to run performing the steps noted in the process flow diagram 200 of FIG. 22. The Inbound Monitor module 310 process 200 of this node 160 gets a data frame form the in-bound direction, as indicated in block 202 of FIG. 22 and checks for the destination IP address on each frame, as indicated in block 204 of FIG. 22, showing the process for an Inbound Monitor module 310. If the destination IP equal to its own IP address, the frame is treated as a normal IEEE 802.11 frame, as indicated in blocks 204 and 206. Otherwise, the Inbound Monitor 310 process 200 will look up the corresponding virtual link entry for this frame, if there is one, as indicated in block 208.

If a suitable virtual link is located successfully, this frame can then be re-encapsulated according to this virtual link entry and sent to the physical layer immediately, as indicated in block 210. If no corresponding virtual link is found, the self-learning module 312 will be triggered, as indicated in block 220. The self-learning module 312 will monitor the out-going direction of the IEEE 802.11 MAC. After re-encapsulation by the routing layer 132, the frame, which triggered the self-learning module 312, will be shown again on the outbound direction.

Figure 23:
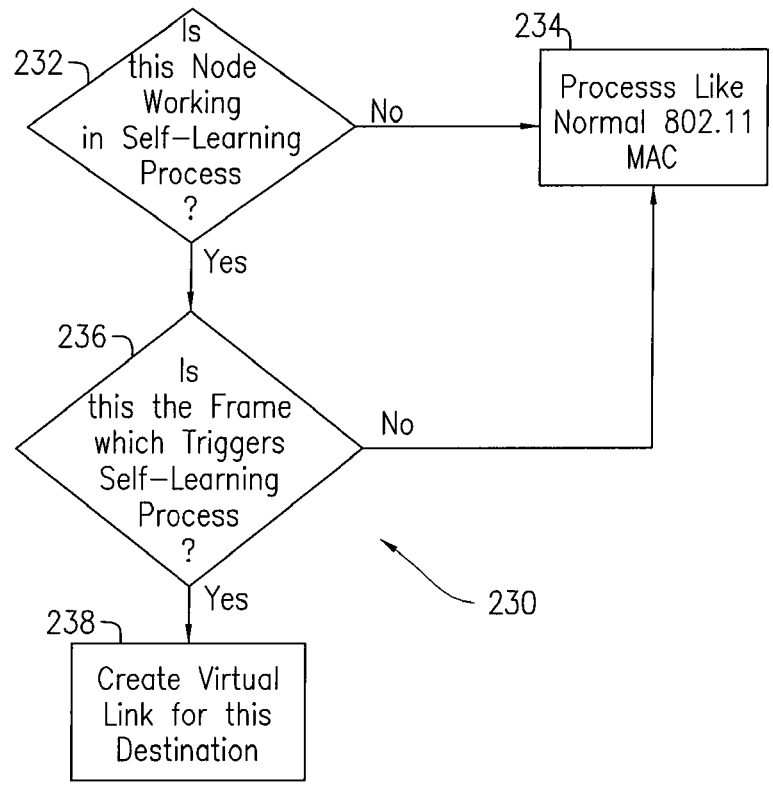
FIG. 23 illustrates schematically and in block diagram flow chart diagram form an example of process steps for a self-learning module according to aspects of the disclosed subject matter.

The self-learning module 312 can then create a suitable virtual link according to the new MAC header of this frame. Thereafter, when other data frames arrive at this node 160, the Inbound Monitor module 310 will re-encapsulate the MAC header according to corresponding Virtual Link entry created in the self learning module 312 as noted above. FIG. 23 describes the work flow process 230 for the Self-Learning module 312.

The self learning module 312 process 230 shown in FIG. 23 can determine if the node is in Self-learning mode, as indicated in block 232. If not, then the frame may be processed as usual according to a MAC protocol, such as 802.11. If yes, then the self-learning module 312 process 230 can determine in block 236 if the frame is the frame which triggered the self learning process as indicated in block 220 of FIG. 22. If not, then the frame is also processed as usual under the MAC protocol as indicated in block 234. If yes, then the self-learning module 312 creates a virtual link for this frame destination as indicated in block 238, which can then be placed in a virtual link table, which may be maintained in any convenient and accessible memory associated with the system, such as in the communication device, the host or the like.

Two parameters are also proposed to be generated, an integer value $T_e$ and a boolean value MRU. $T_e$ can be used to decide the time of expiration for the virtual link entry. If a virtual link entry is not activated for $T_e$ data frames, the entry is removed from the virtual link table. The Boolean value MRU can be used for maintaining the Virtual Link Table. With MRU set to TRUE, the MAC Layer 124' can be set to monitor a Routing Protocol Data Unit ("RPDU") on both inbound and outbound directions. When an RPDU is found, the whole Virtual Link Table is cleared. If this boolean value is set to FALSE, a Virtual Link Table entry can only be removed when the expiration timer is triggered at the expiration of $T_e$.

In addition to a self-learning enabled virtual link MAC Layer 124', applicants propose a cross layer designed virtual link. In the cross layer design an interface is created between the MAC layer 124' and the routing layer 132 of FIG. 20. This design can result in less system resources being consumed in maintaining the Virtual Link Table. Two different processes are proposed, a routing layer active process and a MAC layer poll process.

Figure 24A:
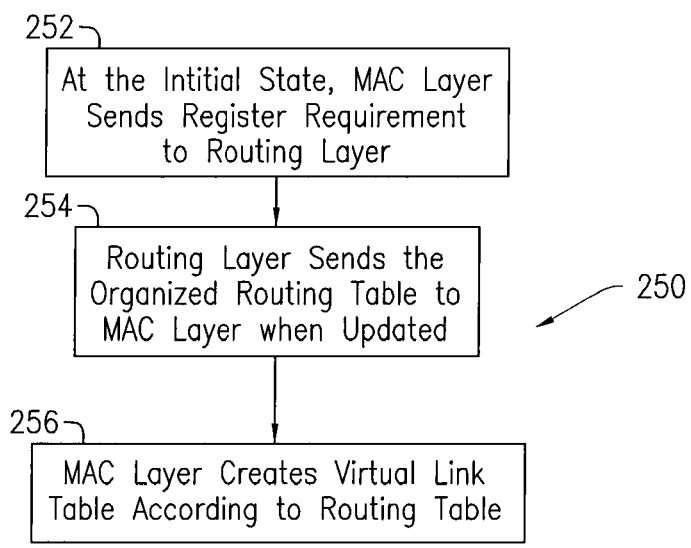
FIGS. 24a and 24b illustrate schematically and in block diagram flow chart diagram form an example of process steps for a routing layer active process according to aspects of the disclosed subject matter.
Figure 24B:
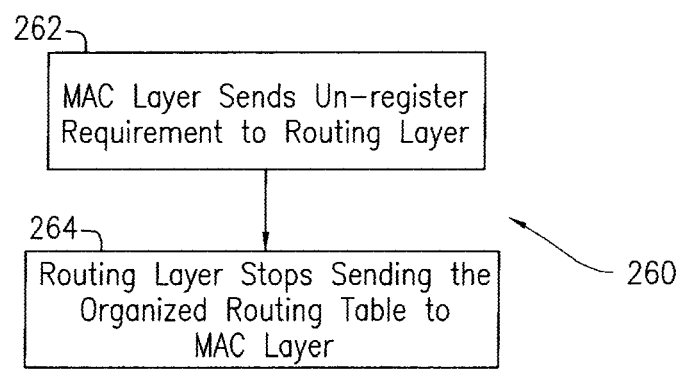

In a Routing Layer Active Process, as illustrated schematically and in block diagram process flow diagram form in FIGS. 24a and 24b, such a process at the initial stage of the MAC layer 124' execution, can be used in a process 250 as illustrated in FIG. 24a, to send a Register requirement to the routing layer 132 as indicated in block 252 of FIG. 24a. After that, when the routing layer 132 routing table is updated, the routing layer 132 will send the organized routing table to the MAC layer 124', as indicated in block 254 of FIG. 24a. The MAC layer 124' can then create a corresponding Virtual Link Table according to the routing table, as indicated in block 256. Thus, when a frame is received, the MAC layer 124' can check the destination IP address of this frame, and if the destination IP address is not the same as the IP address of the node 160, this node 160 can look up a Virtual Link Entry from the Virtual Link Table, and re-encapsulate this frame according to the Virtual Link Entry and then forward it to that link.

After the MAC layer 124' sends an Un-Register request to the routing layer 132, as illustrated in block 262 of FIG. 24b, the routing layer 132 can stop sending routing table information to the MAC layer 124'. With this process, the routing layer 132 can work as a routing table maintainer. The MAC layer 124' can take charge of route lookup and frame re-encapsulation.

Figure 25A:
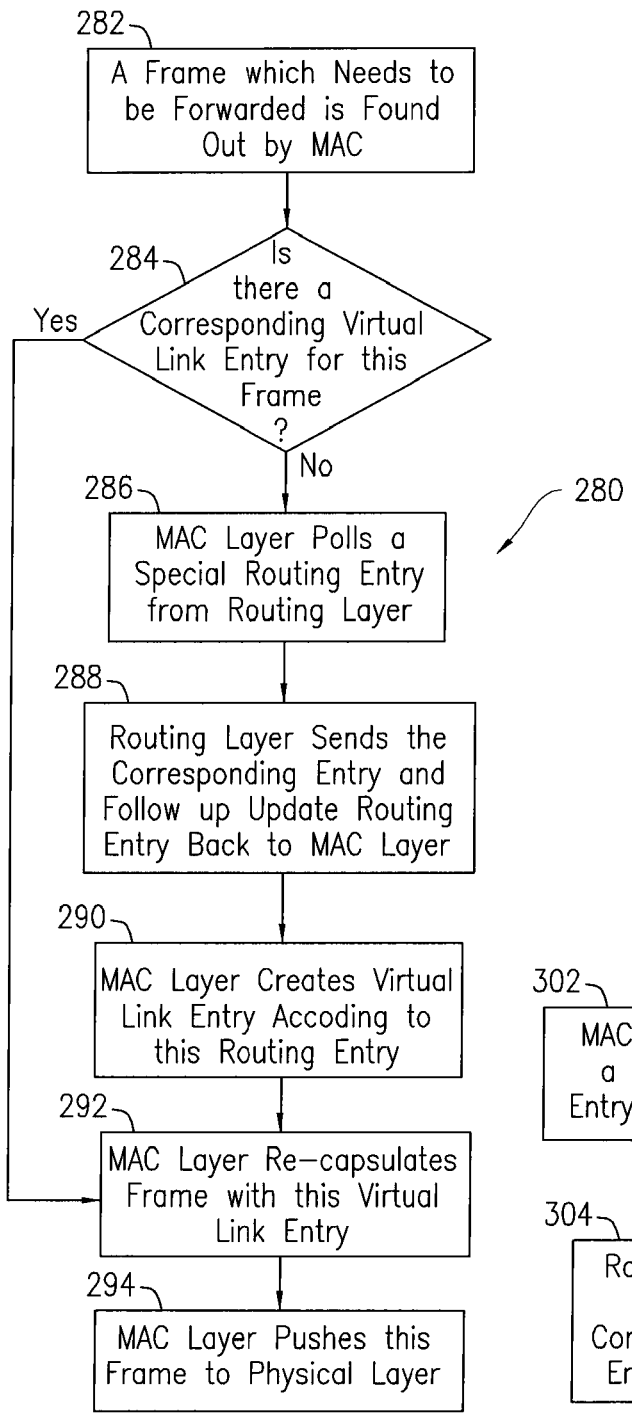
FIGS. 25a and 25b illustrate schematically and in block diagram flow chart diagram form, an example of process steps for a routing update process according to aspects of the disclosed subject matter.
Figure 25B:
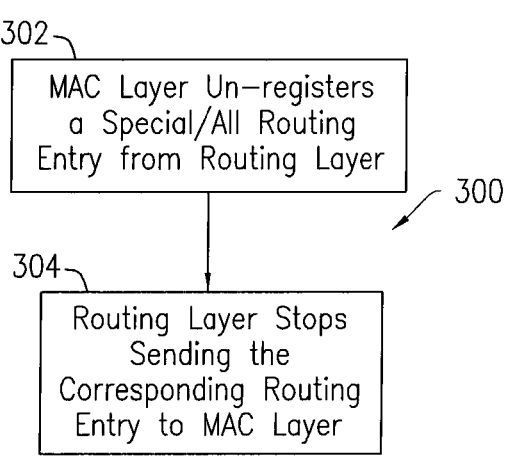

According to a MAC Layer 124' poll process 280, illustrated in FIGS. 25a and 25b, schematically and in block diagram, process flow diagram format, by way of an example, the MAC layer 124' can poll for information from the routing Layer 132. As soon as a frame is received by the MAC layer 124', the destination IP address will be found and compared with the IP address of this node 160. If this node 160 is not the destination for this frame, as indicated in block 282, the MAC layer 124' can look up the Virtual Link Table first and, if a corresponding entry in the Virtual Link Table is found, the MAC layer 124' can re-encapsulate the frame with the virtual link entry, as indicated in blocks 284 and 292.

If no corresponding virtual link entry is found in block 284, the MAC layer 124' can send a Register requirement for this IP address to the routing Layer 132, as indicated in block 286 of FIG. 25a. The routing layer 132 can then send the corresponding routing entry and follow up update routing entry information to the MAC layer 124', as shown in block 290. The MAC layer 124' can then create a Virtual Link Entry for this frame according to the Virtual Link Entry and reencapsulate this frame with this Virtual Link Entry, as indicated in block 292 and then push this frame back into wireless channel as indicated in block 294.

The MAC layer 124' could send an Un-Register request for all the Virtual Link Entries or just one of them to the routing layer 132, as indicated in block 302 of FIG. 25b showing schematically and in block diagram flow process diagram format a process 300, as an example. After this, the routing layer 132 will stop sending the corresponding routing update information to the MAC layer 124', as indicated in block 304. Therefore, the routing layer 132 can continue to maintain the routing table and looking up routing entries for the whole system while the MAC layer 124' can only re-encapsulate the one frame.

Experimental Results

For the purpose of evaluating the performance of the proposed MAC structure, applicants have conducted experiments which are briefly presented below. A primary focus is upon three metrics—round trip time for various packet sizes and different numbers of hop counts, processing time in routing nodes and throughput.

As a test bed setup, applicants used Soekris NET5501 boards for mesh network 150 nodes 160. NET5501 was equipped with a 433 MHz AMD Geode LX (X86 architecture) CPU, with a 512 MB DDR-SDRAM. A compact flash card was used for software and data storage purpose. A customized Linux 2.6.24.6 was deployed in each of the nodes 160 as a host. IPTABLE was applied for blocking the communication in order to simulate designed topology. The wireless transceiver for a particular node 160, such as node C in FIG. 21 was an Atheros chipset based wireless network interface card ("WNIC").

The proposed MAC layer 124' was implemented within the driver of this WNIC. ICMP and IPERF were used for measuring the performance of the proposed MAC layer 124'. According to the results of these experiments, ICMP packets with different sizes were used for measuring the Round Trip Time ("RTT"). IPERF was used for measuring the throughput between a source-destination pair. Measurements of RTT were made comparing a standard AODV routing protocol with a standard AODV in addition to the proposed MAC functionalities for different packet sizes. RTT time consumption was also measured for different hop counts. The results of the experiments demonstrated decreases in RTT. For small packet sizes, the improvement was around 12%. When the packet sizes increased, the improvement increased. That is, because for bigger packet sizes, more average transmission time was required.

Throughput measured on the destination node was slightly faster with standard AODV. In order to find out the time consumption for the whole routing progress, applicants used two monitors on inbound and outbound directions of the MAC layer. With the time difference in these two monitors, time consumption for routing was measured. The experimental results showed that a 100% improvement in required RTT was obtained with 64 byte packets, 1,500 byte packets and 64,000 byte packets showed generally the same level of improvement.

In order to avoid drawbacks noted above, applicants also propose to introduce a multi-data link control Layer (Layer 2.5) 400 as shown schematically and in block diagram form in FIG. 29. The proposed multi-data link controller 400 and the software implementation processes discussed herein obviate the need for modifications to the PHY hardware 354 as illustrated schematically in FIG. 27 or other layers of the traditional protocol stack 350 shown in FIG. 27, such as the TCP layer 356 or the IP layer 358. Applicants also propose dynamic load balancing and learning TCP processes and a multi-IP controller layer (Layer 3.5) 420 architecture and functionalities for the multi-IP controller layer 420.

Multi-link data controller layer 2.5 400 may include an architecture implementing a method to solve the following problems, reordering, and dynamic load balancing. With regard to reordering, the reordering function in the traditional data link layer 352 illustrated in FIG. 27 can only handle out of order packets for one PHY 354 connection, at least on the receiver side, as illustrated schematically in FIG. 27. However, when there are multiple PHY layers 354*a*, 354*b* . . . 354*n*, as seen in FIG. 29, packets can arrive out-of-order more frequently, e.g., due to collisions in the different bands corresponding to the different PHY layers 354*a*, 354*b* . . . 354*n*. Legacy data link layer 352 cannot handle such situations. Applicants propose an architecture which can handle out of order packets.

With regard to dynamic load balancing, it can be important to balance the traffic load on the available PHY devices 354*a*, 354*b* . . . 354*n*, in order to improve the efficiency (e.g., throughput). Since wireless network conditions change randomly with time, traditional data-rate based static load balancing methods may not be effective. Therefore, applicants have produced a design to solve this problem, such as by utilizing a dynamic load balancing process.

Figure 30:
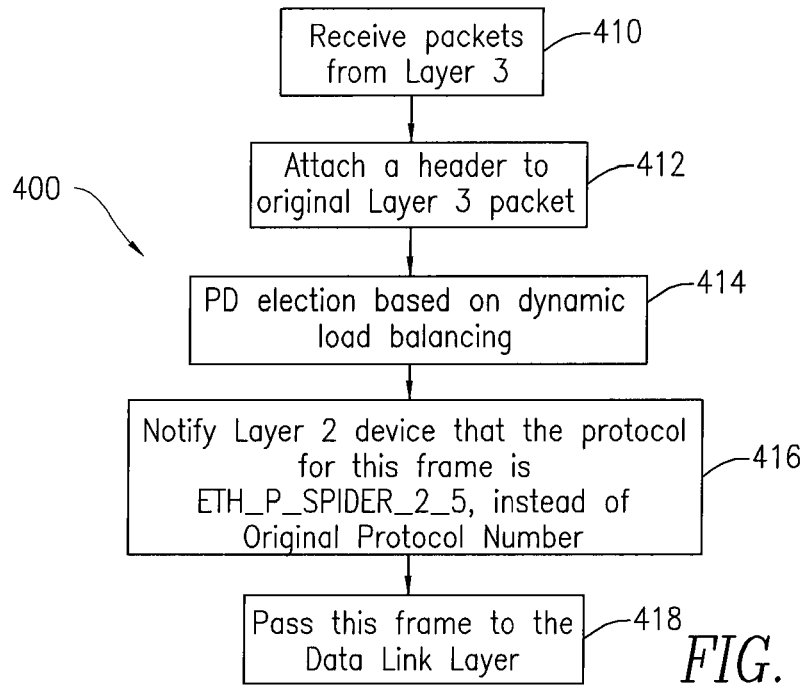
FIG. 30 illustrates schematically and in block diagram flow chart diagram form a process for packet transmission according to aspects of an embodiment of the disclosed subject matter.

In a process for packet transmission, e.g., as illustrated schematically and in block diagram form in FIG. 30, for the purpose of controlling the physical devices ("PDs") 354*a*, 354*b* . . . 354*n*, applicants propose to introduce the notion of a virtual device ("VD"), as illustrated in FIG. 10. The IP layer 358 as illustrated in FIG. 27 can be used to send packets to this VD 400, the operation of which is illustrated schematically and in block diagram form in FIG. 30. The proposed VD 400 can have the following tasks to perform:

allocating packets to different PDs 354*a*, 354*b* . . . 354*n*, according to a dynamic loading balance algorithm;

attaching a header to the original packets, whereby a receiver, using this information in the header, can reorder these frames;

setting a Layer 3 PD protocol notification field in the Layer 2 header, to indicate the protocol type (e.g., IP, ICMP, ARP, etc.) to the higher layers, assisting the receiver in determining a Layer 3 handle function as the frame is passed to the higher Layers, all of which is illustrated schematically and in block diagram form in FIG. 30.

As illustrated in FIG. 30, in the transmitter multi-link data controller virtual device 400 may receive packets from Layer 3, as illustrated in block 410 of FIG. 30. The multi-link data controller virtual device 400 may attach a header to the original Layer 3 packet, as illustrated in block 412 of FIG. 30. The device 400 may then make a physical device election based on dynamic load balancing, as illustrated in block 414 of FIG. 30.

The device 400 may then notify the respective Layer 2 data link Layer 1 device 352*a*, 352*b* . . . 352*n* that the protocol for the frame is, e.g., ETH_P_SPIDER__2__5 instead of the original protocol number, as indicated in block 416. The frame is then passed to the respective data-link layer 1 device 352*a*, 352*b* . . . 352*n*, as indicated in block 418.

Figure 31:
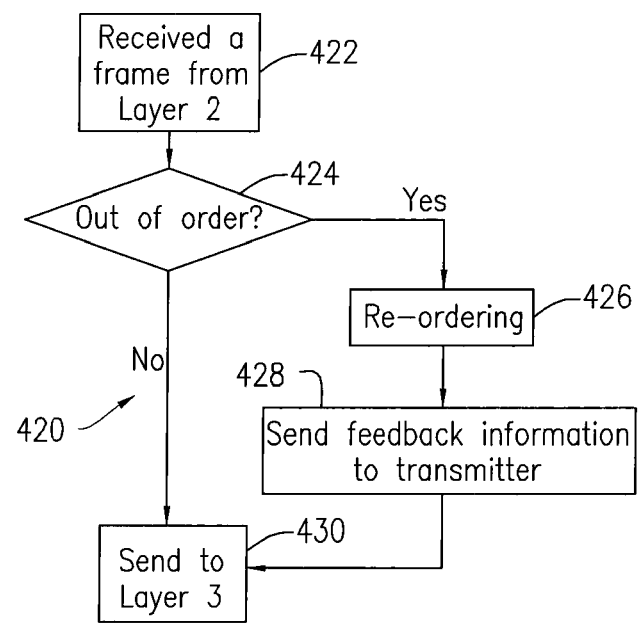
FIG. 31 illustrates schematically and in block diagram flow chart diagram form a process at the receiver according to aspects of an embodiment of the disclosed subject matter.

FIG. 31 shows an example of a process at the receiver. Additional header information has been inserted during the transmission and also the protocol field has been modified in the transmitter. Therefore, the Layer 2 352 of FIG. 27, data link layer, at the receiver will not send the received frames directly to Layer 3 358 (IP layer) in FIG. 27. A new packet type can be registered (e.g., using the handle function) in the operating system at the receiver. After reading the value in the protocol field, Layer 2 352 can send frames to the corresponding handle function, 420 of FIG. 31.

Major responsibilities of this function 420 are to re-order frames, and send feedback information back to the transmitter, for dynamic load balancing. This is illustrated schematically and in block diagram form in FIG. 31. The IP layer handle function can receive a frame from Layer 2 as illustrated in block 422 of FIG. 31. In block 424 the handle function determines whether the frame is out of order and, if yes, proceeds with reordering in block 426, and if not, proceeds with sending the frame to Layer 3 in block 430. If the reordering is done, a feedback is sent to the transmitter according to block 428.

Figure 32:
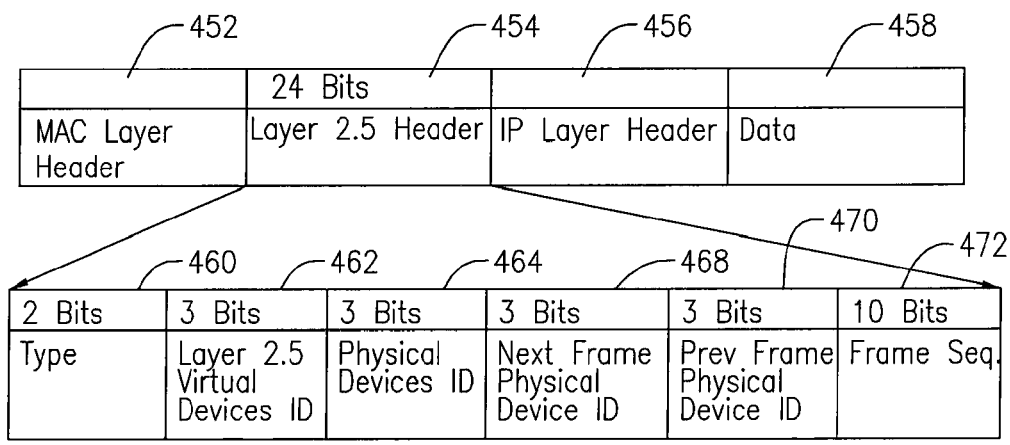
FIG. 32 illustrates a layer header structure according to aspects of an embodiment of the disclosed subject matter.

A data frame header format for layer 2.5 400 of FIG. 29 is constructed as follows. After receiving a packet from the IP layer 352, a new header is attached to the original packet. FIG. 32 shows the Layer 2.5 400 header structure. The packet has a MAC Layer Header 452, a Layer 2.5 Header 454, an IP Layer Header 456 and Data 458. The Layer 2.5 Header contains 2 bits of Type information 460, 3 bits of Layer 2.5 Virtual Devices ID information 462, 3 bits of Physical Devices ID information 464, 3 bits of Next Frame Physical Device ID information 468, 3 bits of Previous Frame Physical device ID information 470, and 10 bits of Frame sequence information 472.

As to the Type field 460, 00 may as an example be used to denote data frames and 01 for management frames, with 10 and 11 reserved. As to the Virtual Device ID field 462, multiple virtual devices 400 could be created in one host. The maximum number of virtual devices is 8 with a three bit designation, however, this number is expandable with additional bits for the Virtual Devices ID field 462. With regard to the Physical Devices ID field 464, as an example the maximum number of PDs belonging to one VD is 8 because of the 3 bits assigned to this field 464. As to the Next Frame Physical Device ID field 468, this field indicates the next physical device that is selected for use. Regarding the Previous Frame Physical Device ID field 470, this field indicates the physical device that was in use for the previous frame. The Frame Sequence Number field 472 can be used, as an example, to identify the message in order to eliminate duplicate frames.

In multi-network communication in multiple bands there is a higher chance of receiving out-of-order packets. This is because, packet collisions can occur in various bands. For example, let two channels be available, say, channel 1 (a 2.4 GHz band) and channel 36 (a 5 GHz band). Let two frames F1 and F2 be transmitted using two different physical devices. Which of these two frames will be received first depends on the channel collision probabilities and other factors in these two bands. This could result in a higher number of received out-of-order packets.

Figure 33:
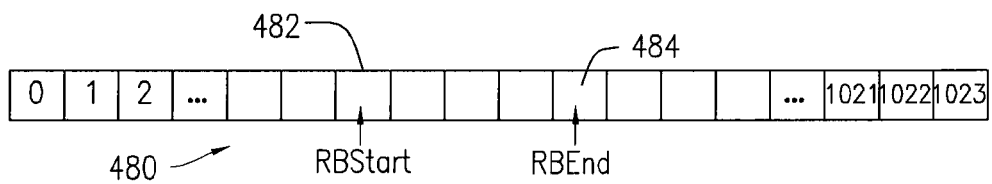
FIG. 33 illustrates a reordering buffer according to aspects of an embodiment of the disclosed subject matter.

In order to deal with this, applicants propose to create a reordering buffer 480 as illustrated schematically in FIG. 33, e.g., in the receiver side. Two pointers RBStart 482 and RBEnd 484 are created for maintaining this buffer. RBStart 482 can be utilized as an example to indicate the sequence number of the frame that is expected to be received with correct ordering. RBEnd can likewise be used to indicate the largest sequence number of a frame that has so far been received. As soon as a frame is received, the sequence number of this frame is checked. If the sequence number is equal to RBStart 482, this frame will be passed up to the IP layer. RBStart can then be incremented to the next frame sequence number. If the sequence number of the received frame is larger than RBStart, this frame will be stored in a receive buffer. If the sequence number is larger than RBEnd, RBEnd can be updated to this value.

In order to limit the waiting delay in receiving the frames to organize them in the correct order, a maximum waiting time limit may be set. For this, two bounds can be used, namely, MAX_BUFFER_LENGTH and MAX_WAIT_TIME. After a frame is received the following two conditions may also be checked, whether RBEnd-RBStart>MAX_BUFFER_LENGTH and whether RBStart_new=RBEnd−MAX_BUFFER_LENGTH. If RBEnd-RBStart>MAX_BUFFER_LENGTH and RBStart_new=RBEnd−MAX_BUFFER_LENGTH, the system can pass all the frames between RBStart 482 and RBStart_new 482 to the next upper layer, and update RBStart 482 to RBStart_new 482.

When a frame is received a receive timestamp (receive_timestamp) for this frame may be noted. Current_time can denote the actual time in the clock. For all the frames in the receive buffer, if current_time−receive_timestamp>MAX_WAIT_TIME, this frame, as an example, is sent to the IP layer 358 since these frames are old enough and ready for processing by upper layers. The system can then update RBStart 482.

Figure 34:
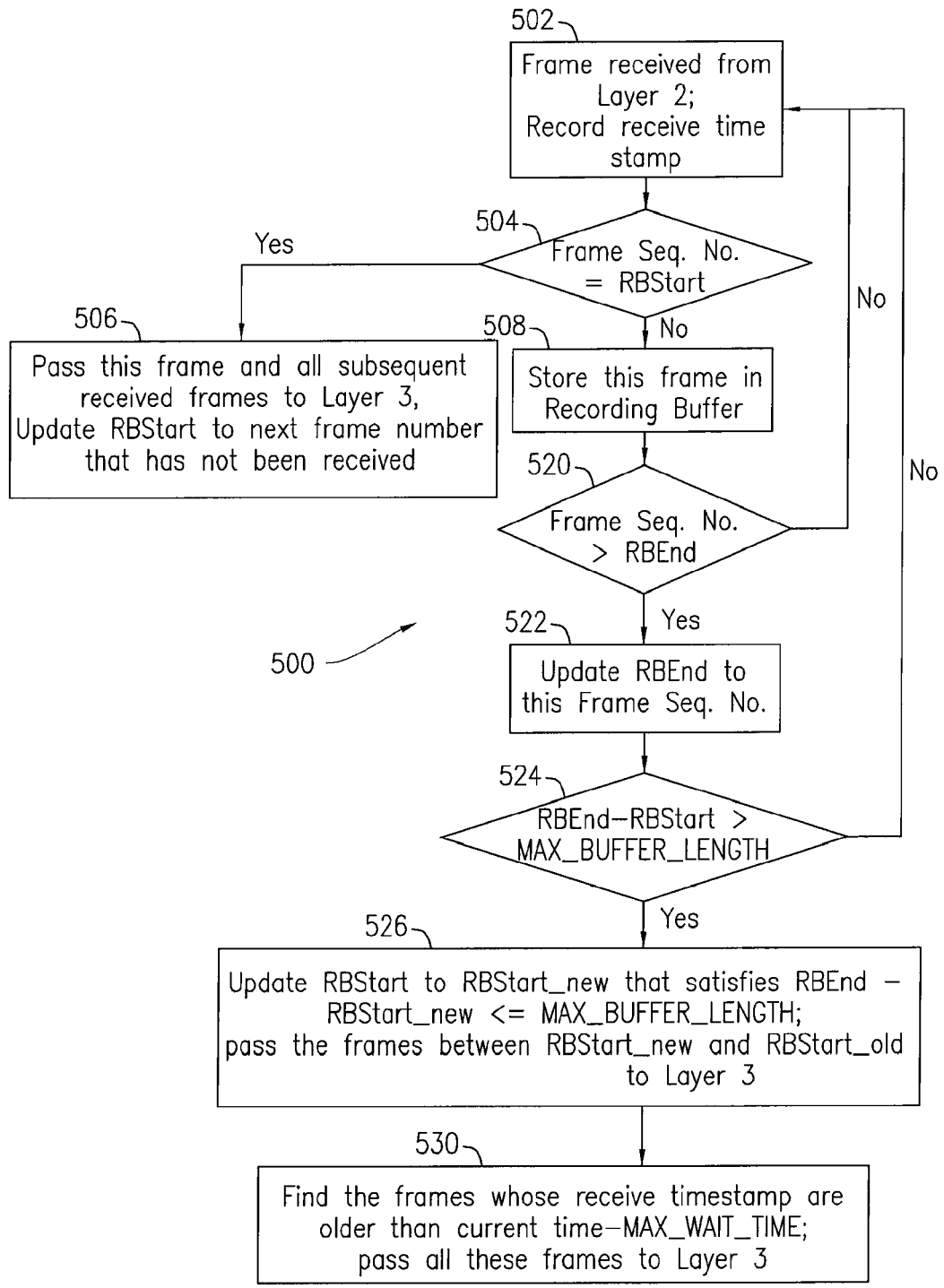
FIG. 34 illustrates schematically and in block diagram flow chart diagram form a frame ordering process at the receiver according to aspects of an embodiment of the disclosed subject matter.

The process 500 is shown schematically and in block diagram form in FIG. 34, where, as an example, a frame is received from Layer 2 and recorded with a receive time stamp in block 502. In block 504 the frame sequence number is checked against RBStart 482, and if equal to RBStart 482, the frame is passed and all subsequent received frames are passed to Layer 3. RBStart 482 is incremented, unless the next frame has already been received, in which event RBStart 482 is set to the next frame number that has not yet been received, as indicated in block 506.

If the frame sequence number is determined in block 504 not to equal RBStart 482, then in block 508, the frame is stored in a reordering buffer. If the frame sequence number is determined in block 520 not to equal RBEnd 484, the process returns to block 502. If the frame sequence number is equal to RBEnd 484, the RBEnd 484 is updated to this sequence number in block 522. In block 524, it is determined if RBEnd 484−BRStart 482 is >MAX_BUFFER_LENGTH, and if not, the process returns to block 502. If RBEnd 484−BRStart 482 is >MAX_BUFFER_LENGTH, then in block 526, RBStart 482 is updated to RBStart_new 482 such that RBEnd−RBStart≤MAX_BUFFER_LENGTH, then the frames between RBStart new 482 and RBStart_old 482 are passed to Layer 3. Finally, in block 530, the system will find all frames whose receive time stamps are older than the current time−MAX_WAIT_TIME and pass all of these frames to Layer 3.

The MAX_BUFFER_LENGTH and MAX_WAIT_TIME limits help to alleviate the effect of lost frames. Applicants also propose a method to quickly identify lost frames, e.g., by identifying waiting patterns, of which two are discussed herein by way of example.

Assuming as an example, three physical devices PD0, such as 354a, PD1, such as 352b, and PD2, such as 352c (not shown), are used for communication. After a certain time, T_n if all the frames from a physical device 354a, 354b, 354c are not received this may indicate frequent collisions in the corresponding respective spectral bands. For example, at time T_n, considering a status of the receive buffer to be such that RBStart=100 and RBEnd=108, and assume that the frames with sequence numbers 100, 103, 106 have not yet been received. Suppose all the received frames in the buffer are from PD1, 354b, and PD2, 354c, and not from PD0, 354a, one can consider this to be due to collisions in the channel corresponding to PD0, 354a. The receiver process can then be caused to wait for the lost packets from PD0, 354a, until the MAX_WAIT_TIME or MAX_BUFFER_LENGTH limit is exceeded, i.e., for the receipt of a packet from the corresponding channel, such as in the example, PD0, 354a.

Assuming at another time instant T_n1, a frame from PD0 is received and the frame sequence number is 103 but frame 100 only has not yet been received. Then frame 100 can be considered a lost frame. Frames 101, 102, 103, 104, 105 can then be passed on to the IP layer 358, and RBStart can be updated to 106.

Figure 35:
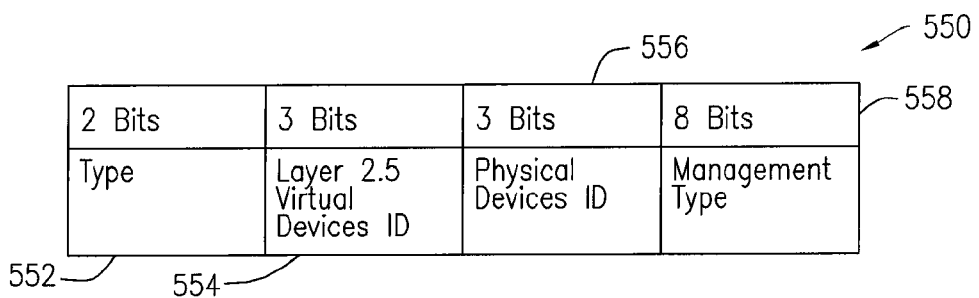
FIG. 35 illustrates a management frame structure and header format according to aspects of an embodiment of the disclosed subject matter.

A management frame structure and header format 550 for Layer 2.5 400 is shown schematically and in block diagram form in FIG. 35 by way of an example. The format may include 2 bits for type in block 552, 3 bits for Layer 2.5 Virtual devices IDs in block 554, 3 bits for Physical Devices IDs in block 556 and 8 bits for management type in block 558.

Multiple levels of dynamic adaptation can be represented. A stochastic learning automaton can be used to learn to balance the load among the different virtual devices or physical devices. Dynamic adaptation can also be implemented at different layers of the protocol stack, e.g., to learn optimal rates, routes, transfer control protocol ("TCP") rates etc.

In a wired network most frame loss events and out-of-order frames events indicate network congestion because of the almost negligible chances for frame collisions. However, in a wireless network, such factors as the high bit error rate ("BER") and collision probability, induce lost frames and out of order frames. A traditional transmission control protocol ("TCP") congestion window algorithm cannot differentiate between physical layer errors and network congestion.

Therefore, applicants propose the introduction of a learning TCP process. A metric which may be used by the proposed learning TCP process is:

$$Transfer_{rate} = \frac{\text{Packets transferred in last window}}{\text{Packets acked in current window}}$$

Figure 36:
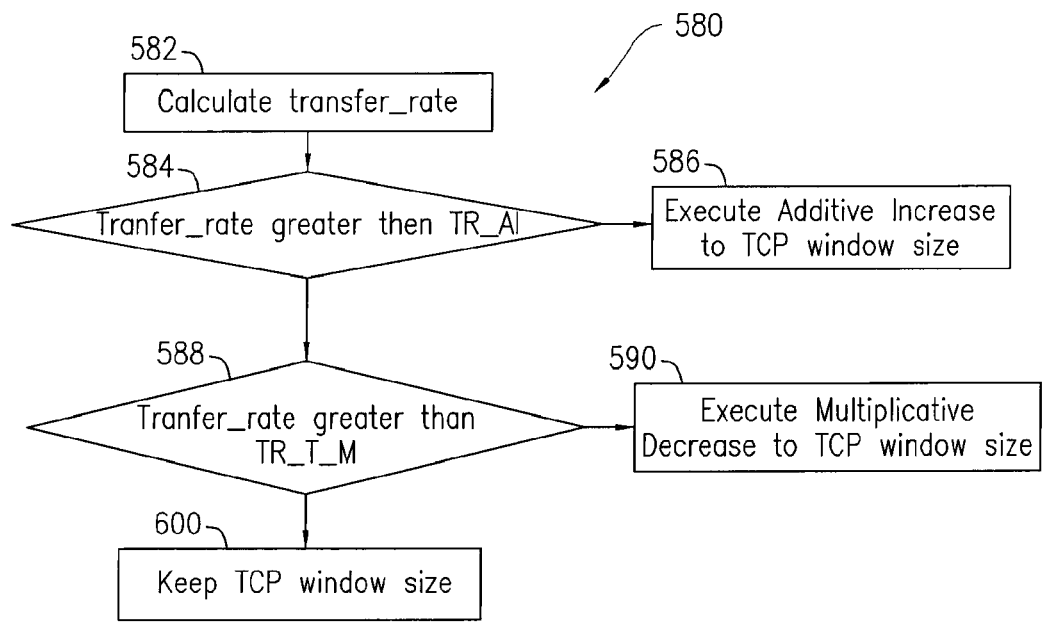
FIG. 36 illustrates schematically and in block diagram flow chart diagram form a TCP window size modification process according to aspects of an embodiment of the disclosed subject matter.

In one embodiment, the steps used by the learning TCP congestion control process, by way of an example, can be the following, as illustrated schematically and in block diagram form in the process flow chart of FIG. 36. Utilizing a TCP Reno congestion avoidance algorithm, one may calculate an initial TCP transfer rate in block 582.

Based on the TCP segment loss rate when the TCP Reno algorithm halves the TCP window size for the first time, learning TCP will begin to take charge of the window size management process. If the throughput has not saturated, the transfer_rate will likely be close to 1, under this case, and an additive increase to congestion window size can be executed. This action can be repeatedly performed in block 586 until transfer_rate is greater than a threshold TR_AI, as determined in block 584. Once transfer_rate is greater than TR_AI, and less than TR_T_M, as determined in block 588, the system will not take any action on the window size as indicated in block 600. If window size is too big, the packet transferred in the last window will be much larger than a packet acknowledged ("ACKed") in the current window. Under this case, one can define a threshold TR_T_M, when transfer_rate is greater than TR_T_M, and begin to execute a multiplicative decrease to the windows size as indicated in block 590.

Layer 3.5 can have an architecture that performs the functions of providing multiple IP connections and mobility, such as mid-range mobility. Multiple IP connections could be used such as using a 3G cellular connection and a wireless LAN connection. Applicants propose that by bonding these multiple IP connections together, one can provide better spectral efficiency. Mobile devices experience frequent movement at different scale. For example, midrange mobility is equivalent to moving between offices, floors and also buildings.

Original TCP/IP protocol uses a four elements ID {source address, source port, destination address, destination port} to maintain a connection. This structure can make it very difficult or impossible to create a transmission layer connection based on multiple IP connections. For example, when any one of these four elements changes, the connection will cease to exist. The application will then have to create the required connection once again. Fox example, suppose a video/audio streaming application is started over a cellular network. If the transmitter or receiver moves from one base station to another during this time period, this video/audio stream will be broken at least for some time.

Figure 37:
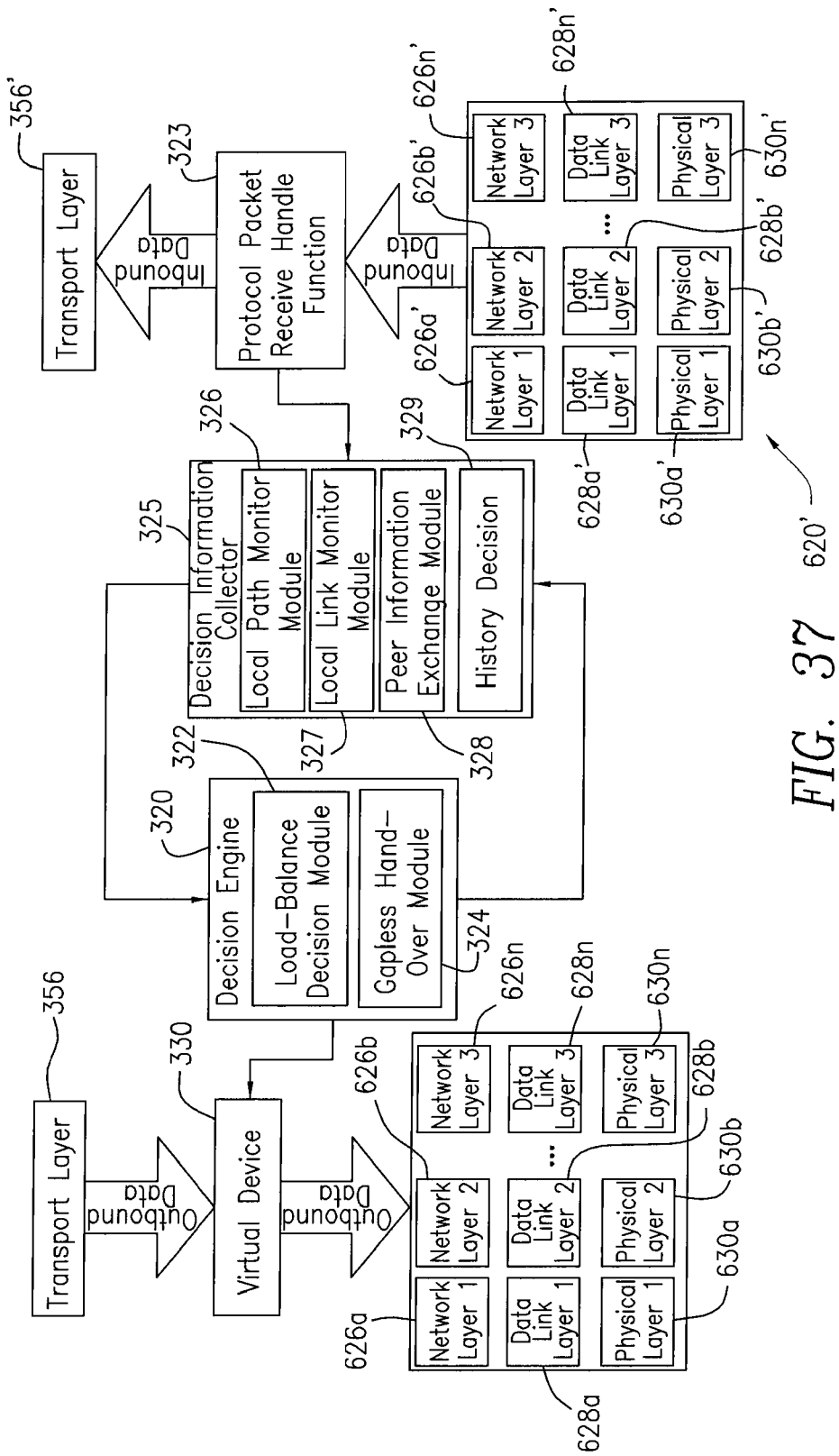
FIG. 37 shows schematically and in block diagram form, as an example, a structure for a proposed multiple IP transmission layer connection protocol and architecture according to aspects of an embodiment of the disclosed subject matter.

Applicants, therefore, propose the creation of a transmission layer connection that can be based on multiple IP connections. FIG. 37 shows schematically and in block diagram form, as an example, a structure for a proposed Layer 3.5 Multi-IP controller protocol architecture 620. A system structure may provide for connection initialization and virtual device creation.

Connection initialization may be utilized when a connection establishment requirement is presented. A Layer 3.5 probe packet may be sent by the transmitter to a peer node, including available IP connections, with one connection noted as a primary IP connection. If the peer node has Layer 3.5 capability, an ACK frame can be sent by the receiver and will be received at the transmitter, and the available IP connection information can also be sent, i.e., as an example available IP connections at the receiver. One of the IP addresses can be marked as a primary IP address for the layer 3.5 ID. Thus a record of available IP connections to peer nodes can be created on the transmitter and receiver sides in a peer information exchange module 328 maintained in both the transmitter and receiver.

A Virtual Device 330, e.g., which may utilize one or more of network layer, datalink layer, physical layer combinations 626*a*-628*a*-630*a*, 626*b*-628*b*-630*b* . . . 626*n*-628*n*-630*n* which can then be created in each peer. The receiver may have one or more corresponding network layer, data link layer, physical link layer combinations 626*a*'-628*a*'-630*a*', 626*b*'-628*b*'-630*b*' . . . 626*n*'-628*n*'-630*n*'. The system may, e.g., declare some devices from among, e.g., 626*a*-628*a*-630*a*, 626*b*-628*b*-630*b* . . . 626*n*-628*n*-630*n* as default gateways, so that all the packets will pass through these devices, selected from among 626*a*-628*a*-630*a*, 626*b*-628*b*-630*b* . . . 626*n*-628*n*-630*n*.

Such virtual devices 330 can send outbound data through a link selected from among, e.g., 626*a*-628*a*-630*a*, 626*b*-628*b*-630*b* . . . 626*n*-628*n*-630*n*, each of which can individually be utilized to perform a number of tasks, such as, transmission of packets, providing unique device IP and destination IP information, setting a transmission layer protocol and inserting extra header frames. The process is illustrated schematically and in block diagram form, by way of example in FIG. 37.

This virtual device 330 with possible links 626*a*-628*a*-630*a*, 626*b*-628*b*-630*b* . . . 626*n*-628*n*-630*n* can select a suitable physical device, e.g., from among the 626*a*-628*a*-630*a*, 626*b*-628*b*-630*b* . . . 626*n*-628*n*-630*n* combinations, according to the output of the Load-Balance Decision Module 322, for packet transmission.

The transport layer 356 at the transmitter may send outbound data to the virtual device 330. At the receiver the corresponding one of the virtual device links 626*a*'-628*a*'-630*a*', 626*b*'-628*b*'-630*b*' . . . 626*n*'-628*n*'-630*n*' receives the inbound data and passes it to a protocol packet receive handle function 323 which processes and forwards the inbound data to the transport layer 356' in the receiver.

The source IP information in the IP header of a packet can be modified according to the selected physical device combination 626*a*-628*a*-630*a*, 626*b*-628*b*-630*b* . . . 626*n*-628*n*-630*n* IP information. The destination IP information can also be set according to the peer IP connection record. A transmission layer protocol number can be set to a protocol specified number TP_S according to the proposed architecture. An extra header can be inserted in the frames flowing between Network Layer 626*a*-*n* and Transmission Layers 628*a*-*n*, 630*a*-*n*.

Figure 38:
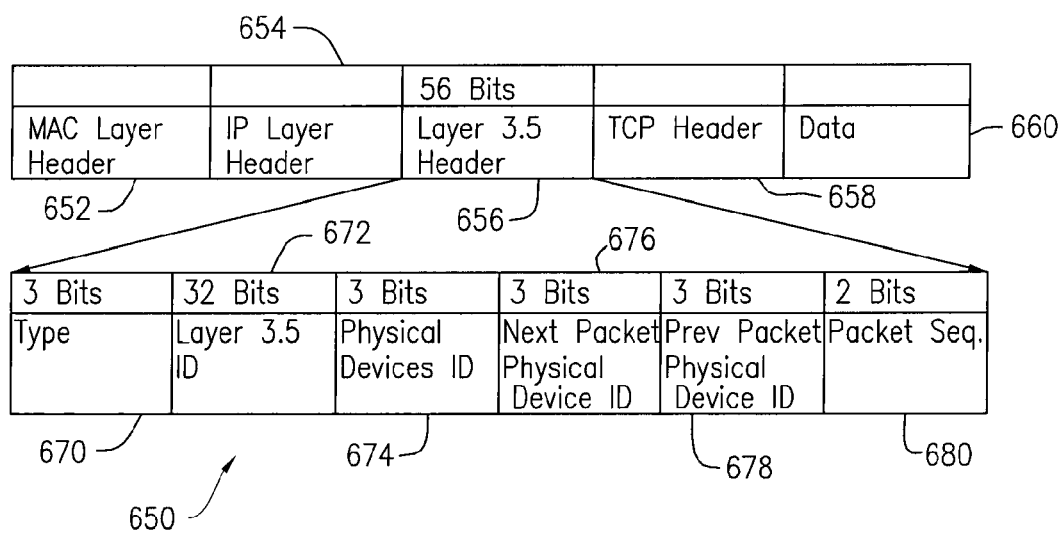
FIG. 38 illustrates a multiple IP transmission layer frame structure and header format according to aspects of an embodiment of the disclosed subject matter.

FIG. 38 shows the header format 650 for a Layer 3.5 420 header 656, which occupies 56 bits defining a multi-link data frame, the header also containing a MAC Layer Header 652, an IP Layer Header 654, a TCP Header 658 and Data 660. The Layer 3.5 header 656 format 650 includes 3 bits for the Type block 670, e.g., 000 for data frames, 001 for IP information update frames, and 010 for link change will happen soon, with 011 to 111 reserved. Also included are 32 bits for Layer 3.5 ID. The IP address of a peer could be modified due, e.g., to mobility. In order to identify different hosts, applicants propose to use the IP address that is used in the first Packet in a certain host as the layer 3.5 ID for the packet. Also included are 3 bits for Physical Devices ID, which limits to 8 the maximum number of PDs 626*a*-628*a*-630*a*, 626*b*-628*b*-630*b* . . . 626*n*-628*n*-630*n* that can belong to one Layer 3.5 connection, as identified by the 3 bits. A Next Packet Physical Device ID, also indicated by 3 bits, can be used to indicate the next physical device that will be used. A 3 bit Previous Packet Physical Device ID 676 indicates the previous physical device that was used. A 12 bit Packet Sequence Number 680 may be used for identifying message order as well as eliminating duplicate frames.

Figure 39:
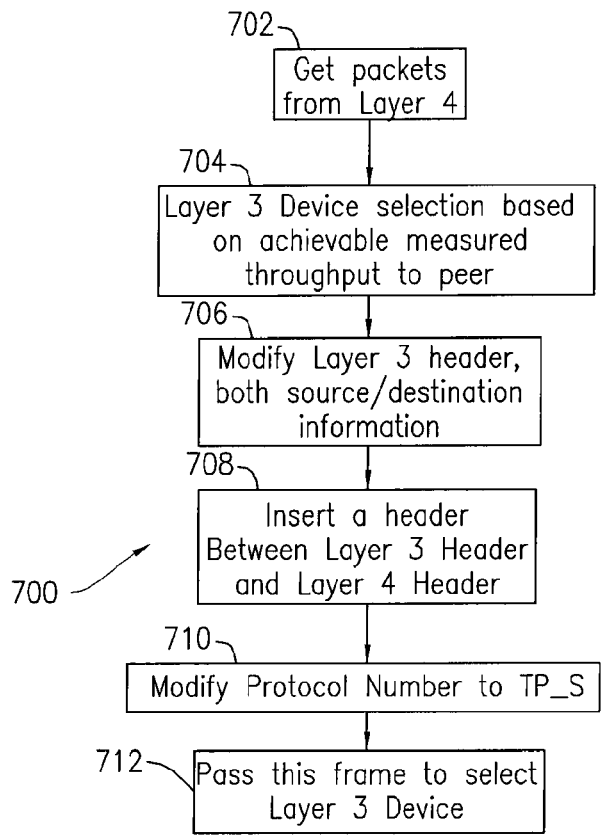
FIG. 39 shows schematically and in block diagram flow diagram form, as an example, a structure for a proposed multiple IP frame transmission process according to aspects of an embodiment of the disclosed subject matter.

A flow chart for a frame transmission process 700 is shown schematically and in block diagram form, by way of an example, in FIG. 39. Packets are obtained from layer 4 in block 702 and a layer 3 device selection is made based on achievable measured throughput in block 704. The layer 3 header is then modified as to both source and destination information in block 7065 and the new header is inserted between the layer 3 and layer 4 headers in block 708. The protocol number can then be modified to TP_S in block 710. Finally, this frame can be passed to the selected layer 3 device in block 712.

A new transmission layer protocol packet type (with handle function) can be registered to the operating system. The IP layer 358 can pass all related packets to the registered handle function. The major tasks then could be to maintain peer IP information; define a new ID: IP device ID, which could be, as an example, a Layer 3.5 ID+Physical Device ID pair as this ID, such as one of 626*a*-628*a*-630*a*, 626*b*-628*b*-630*b* . . . 626*n*-628*n*-630*n* shown in FIG. 37 (which ID could be obtained from a peer IP information record); update to the latest value the IP information update when the IP information update packet is received, which change in Layer 3 IP is then detected without the IP information update packet; and when a packet is received, checking the IP device ID and the source IP address in the IP header, and, if different from the original record, the system can consider that the IP address for this IP device ID pair has changed, and update the record. The packet may then be re-ordered.

Since packets may be transmitted between two nodes via different routes, applicants propose to use a re-ordering buffer to get the sequence of packets in order. A flow chart 750 for a frame reception process is shown schematically and in block diagram format, by way of an example, in FIG. 40. The Layer 2 device can receive a packet destined for layer 3 as indicated in block 752. In block 754 the packet can be determined to be in order or out of order from the expected next packet. If not in order, then the packet can be passed to block 760 where it can be examined to determine if the IP address for the IP device used in transmitting the packet has changed, and if not then it is passed up to Layer 3. If the packet is out of order as determined in block 754, the packet can go to the reordering process represented by block 756 in FIG. 40. If the IP address for the IP device has changed, the peer IP information can be updated in block 762.

For a TCP connection, such as, during a three-way handshake, applicants propose to use only one device. These handshake packets can be transmitted using the original TCP format without any modification.

Figures 41, 42:
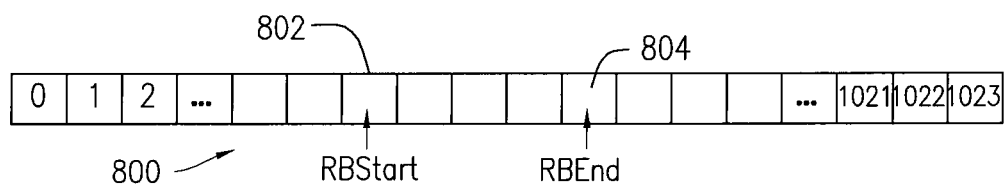
FIG. 41 illustrates a packet format according to aspects of an embodiment of the disclosed subject matter; and, FIG. 42 illustrates a reordering buffer format according to aspects of an embodiment of the disclosed subject matter.

IP connection management can be accomplished by providing, e.g., in a mobile peer, that if the host detects an IP address change in one of the physical devices, it can send an IP information update packet to all of the active (an active TCP connection exists) Layer 3.5 peers. The packet format 780 may be as shown in FIG. 41. The packet format 780 may include an IP Layer Header 782, 3 bits for Type 784, 32 bits for Layer 3.5 Device ID 786, 3 bits for Physical Device ID and 32 bits for Physical Device IP 790.

Figure 40:
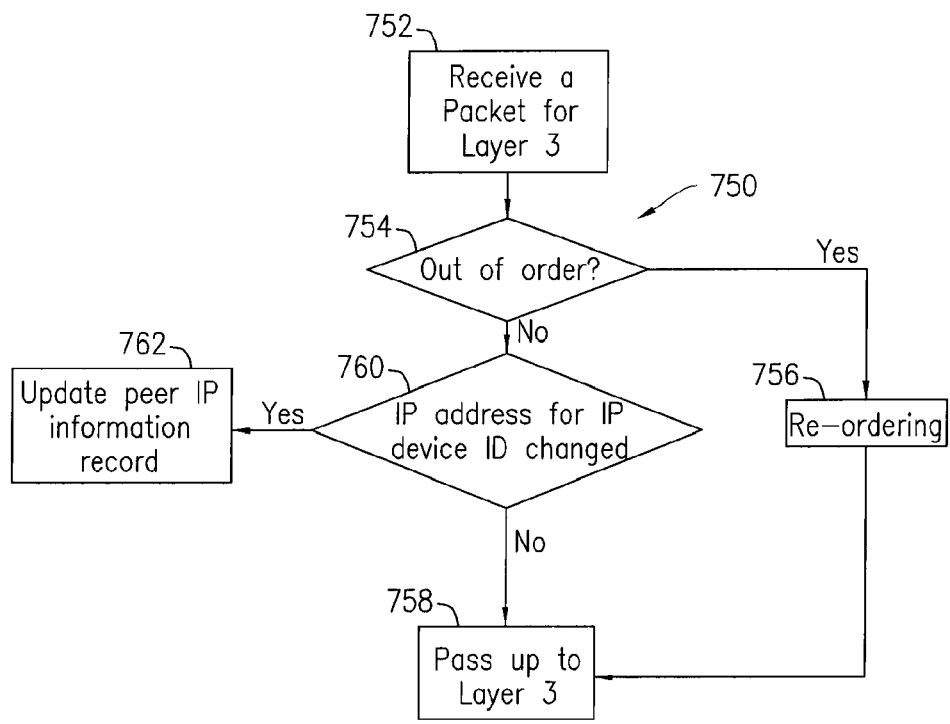
FIG. 40 shows schematically and in block diagram flow diagram form, as an example, a structure for a proposed multiple IP frame reception process according to aspects of an embodiment of the disclosed subject matter.

Re-ordering in block 756 of FIG. 40 may be accomplished utilizing, e.g., a reordering receive buffer 800 illustrated schematically in block diagram form, by way of an example, in FIG. 42. To deal with an out of order packet, a reordering buffer can be placed in the receiver side system. Two pointers RBStart 802 and RBEnd 804 can be utilized for maintaining this buffer 800. RBStart 802 can be used to indicate the packet sequence number of the first packet that has not yet been received. RBEnd 804 can be used to indicate the largest sequence number of a packet that has already been received. As soon as a new frame is received, the sequence number of this frame can be checked. If the sequence number is equal to RBStart, this frame can then be passed to layer 4. RBStart 802 can then be modified to the next packet that has not yet been received. If the sequence number is greater than RBStart 802, the frame can be stored in a receive buffer. If sequence number is greater than RBEnd, RBEnd can be updated to this value.

The system may be designed to not wait for incoming packets without any limitation, e.g., in time of waiting. Two bounds may be defined, MAX_BUFFER_LENGTH and MAX_WAIT_TIME. Each received packet may be checked for these two boundary conditions. If RBEnd-RBStart>MAX_BUFFER_LENGTH, then the system can update RBStart 802, such that, e.g., RBStart_new=RBEnd−MAX_BUFFER_LENGTH, while also passing up all the frames between RBStart_old and RBStart_new to the next upper layer, i.e., layer 4. A received packet can also have its receive timestamp checked. As to all packets in the receive buffer, if current_time−receive_timestamp>MAX_WAIT_TIME, the packet may then be passed up to layer 4, while also updating RBStart 802.

A decision engine 320, residing in the transmitter, may control the transmitter. A decision information collector 235, also residing in the transmitter may collect path/link information from the transmitter, from the receiver and also from the operating system. The decision engine 320 can control the transmitter.

The decision engine 320 can have two modules, a load-balance decision module 322 and a gapless hand-over module 324. A decision information collector 325, also residing in the transmitter may include a local link monitor module 327 which can monitor the link quality (RSSI, BER, etc.). If an upcoming link failure/change event is detected, this local link monitor module 327 can inform the decision engine 320 about the upcoming event. Then the gapless hand-over module 324 can switch traffic to other links, such as all the traffic to the other links, and also send a "link change notification packet" 780 shown in FIG. 41 to notify the peer node about this situation. The packet 780 format, shown in FIG. 41, can include the identification of a current physical device by ID and the identification of a new physical device IP. When the link quality improves, another IP information update packet 780 can then be sent to the peer.

A local path monitor module 326 may also be contained in the decision information center 325. Since not all the link failures/changes may be correctly detected, the local path monitor module 326 has been created to detect path changes from the network layer. When a change of IP address in one of the physical devices is detected, the node can send an IP information update packet to Layer 3.5 and to all of its active peers, i.e., those with which an active transport layer connection exists. The packet format is as shown in FIG. 41.

A load-balance decision module 322 may make use of the information from the decision information collector 325 to decide the real-time load assignments to different paths. The decision information collector 325 can have a local path monitor module 326 to monitor data with ACKS and to monitor the transmitted data in every window. The module 326 may monitor changes in IP addresses and changes in the status of interfaces. A local link monitor module 327 can monitor the link quality, including possible upcoming link failures/changes. A peer information exchange module 328 can exchange local link/path information with peers. A decision history module 329 can store connection decision information after the decision engine 320 makes a decision for a connection. This decision information can be sent by the decision engine 320 to the decision history module 329 module to be stored for reference for future such decisions by the decision engine.

It is known in the art to modify transport layer operation to connect simultaneously with multiple networks with unique protocols. Also such simultaneously access can be to multiple heterogeneous network connections. The art discusses modifying SCTP, with some extension such as ASCONF/ADDIP, in order to simultaneously access multiple heterogeneous network connections, e.g., wired and wireless networks. Also known is how to improve the mobility performance, such as performing handover without connectivity loss, such as by using a modified SCTP. The art relates to generating policies, maintaining policies, and making decisions. Applicants herein propose to deal with how to use traditional transport protocols, such as TCP or UDP, to simultaneously access multiple heterogeneous networks connections. Techniques are disclosed to improve the mobility performance with these legacy transport protocols. The art deals very little with other transport layer protocols. aside from discussing a "TCP-to-SCTP proxy" to achieve compatibility with legacy protocols/applications, although the specifics remain un-disclosed.

Applicants here propose to solve this issue by creating a virtual device in kernel space, e.g., between the device hardware and controller processor or in a host computer or other processor, and to encapsulate the packet from legacy transport protocols into our layer 3.5 protocol. The art, based on a modified SCTP with ASCONF/ADDIP extension, the original SCTP being designed for a wired network, must implement some other modifications for improving mobility performance. applicants propose using a unique layer 3.5 protocol. This layer 3.5 protocol can be natively designed for both "one connection with multiple path" and "unstable wireless" scenarios. In regard to load balancing, the art uses only local information for making decisions. Applicants propose making use of the information from peers also. That is the disclosed subject matter can exploit cooperating with and between peers. In addition in the art load-balancing decisions are made mostly based on service type. Applicants propose making load-balance decisions based on service type and where the peer site is located. also applicants propose active hand over technology with both peers cooperating with each other. When the system predicts one of the paths will be broken soon, the load-balance module will move the data to the other paths before the disconnection happens. If the path is disconnected suddenly, applicants propose making use of the other paths to notify the peer. And also starting a fast retransmission to avoid delays, both of which can protect the communication link in both directions. In the art the hand-over issue is left to the network layer, i.e., does not take an active hand-over approach, unlike the presently disclosed subject matter. The art only performs a stream competition hand-over. Due to lack of a cooperation policy between peers, the peer may not know about the upcoming hand-over. Therefore the art experiences a higher chance of data loss. As to congestion avoidance the implements congestion avoidance in each path, but no details about how exactly this is done. In the disclosed subject matter an algorithm "learning TCP" for wireless paths is used, whereas in wired paths, a traditional congestion avoidance algorithm like new Reno is used. In addition, as opposed to the art, applicants propose a layer 2.5 mode, with a layer 2.5 protocol (LAN scenario), so that upper layers remain standard, i.e., no modification is required.

It will be understood that the embodiments described herein are merely exemplary and that a person skilled in the art may make many variations and modifications without departing from the spirit and scope of the disclosed subject matter. All such variations and modifications are intended to be included within the scope of the subject matter as defined in the appended claims.

We claim:

1. A method of communicating from a first communication device to a second communication device, comprising the steps of:
operating a first communication device having a plurality of physical layer interfaces, each of which is adapted for connection to a respective one of a plurality of communication networks, the first communication device having a virtual device implemented in kernel space, transporting legacy protocols into a layer 3.5 protocol, each of the interfaces including a network layer device, the virtual device being adapted to receive data packets from a transport layer of the first communication device, to modify the data packets in accordance with the layer 3.5 protocol in response to receipt thereof from the transport layer and transmit the data packets to at least one of the interfaces; and
communicating with a second communication device connected to at least two of the plurality of communication networks simultaneously over the respective ones of the plurality of communication networks to which each of the first and second communication devices is connected.

2. The method of claim 1 further comprising:
the step of communicating further comprises the first communication device sending the same communication to the second communication device over each network to which the first and second communication devices are connected and through which the first and second communication devices are communicating, to thereby decrease the probability of the communication interrupting before completed.

3. The method of claim 1 further comprising:
the step of communicating further comprises the first communication device sending different communications to the second communications device over each network to which the first and second communication devices are connected and through which the first and second communication devices are communicating, to thereby increase the bandwidth available for communication between the first and second communication devices.

* * * * *